(12) United States Patent
Tsai

(10) Patent No.: US 8,179,614 B1
(45) Date of Patent: May 15, 2012

(54) IMAGE PICKUP OPTICAL LENS ASSEMBLY

(75) Inventor: Tsung-Han Tsai, Taichung (TW)

(73) Assignee: Largan Precision Co., Taichung (TW)

( * ) Notice: Subject to any disclaimer, the term of this patent is extended or adjusted under 35 U.S.C. 154(b) by 0 days.

(21) Appl. No.: 13/182,964

(22) Filed: Jul. 14, 2011

(30) Foreign Application Priority Data

Jan. 3, 2011 (TW) .................................. 100100099

(51) Int. Cl.
*G02B 3/02* (2006.01)
*G02B 9/60* (2006.01)

(52) U.S. Cl. ......... 359/714; 359/763; 359/764; 359/765

(58) Field of Classification Search .................. 359/714, 359/763, 764, 765
See application file for complete search history.

(56) References Cited

U.S. PATENT DOCUMENTS

| 7,710,665 | B2 | 5/2010 | Park et al. |
| 7,826,151 | B2 | 11/2010 | Tsai |
| 2003/0117722 | A1 | 6/2003 | Chen |
| 2004/0196571 | A1 | 10/2004 | Shinohara |
| 2010/0253829 | A1 | 10/2010 | Shinohara |
| 2010/0254029 | A1 | 10/2010 | Shinohara |

FOREIGN PATENT DOCUMENTS

| JP | 2005266771 A | 9/2005 |
| JP | 2006293042 A | 10/2006 |
| TW | M313781 | 6/2007 |
| TW | M332199 | 5/2008 |
| TW | I329755 | 4/2009 |
| TW | 201038966 | 11/2010 |

*Primary Examiner* — Jack Dinh
(74) *Attorney, Agent, or Firm* — Wang Law Firm, Inc.; Li K. Wang

(57) ABSTRACT

An image pickup optical lens assembly, sequentially arranged from an object side to an image side along an optical axis, comprises the first lens element with positive refractive power having a convex object-side surface, the second lens element with negative refractive power having a concave object-side surface and a convex image-side surface, the third lens element with refractive power, the fourth lens element with positive refractive power having a concave object-side surface and a convex image-side surface, the fifth lens element with negative refractive power having a concave image-side surface with at least one inflection point, and a stop. Each of the five lens elements may be made of plastic with bi-aspherical surfaces. Additionally, the image pickup optical lens assembly satisfies conditions of shortening the total length and reducing the sensitivity for usage in compact cameras and mobile phones with camera functionalities.

27 Claims, 41 Drawing Sheets

Table 1
(Embodiment 1)
f = 4.05 mm, Fno = 2.60, HFOV = 34.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.062200 (ASP) | 0.470 | Plastic | 1.544 | 55.9 | 2.61 |
| 2 | | -4.172300 (ASP) | -0.081 | | | | |
| 3 | Ape. Stop | Plano | 0.221 | | | | |
| 4 | Lens 2 | -2.247260 (ASP) | 0.283 | Plastic | 1.634 | 23.8 | -4.72 |
| 5 | | -9.489500 (ASP) | 0.185 | | | | |
| 6 | Lens 3 | 2.722140 (ASP) | 0.284 | Plastic | 1.544 | 55.9 | -26.69 |
| 7 | | 2.208230 (ASP) | 0.620 | | | | |
| 8 | Lens 4 | -4.569900 (ASP) | 0.688 | Plastic | 1.544 | 55.9 | 3.02 |
| 9 | | -1.271330 (ASP) | 0.710 | | | | |
| 10 | Lens 5 | -6.866600 (ASP) | 0.320 | Plastic | 1.530 | 55.8 | -2.72 |
| 11 | | 1.854900 (ASP) | 0.600 | | | | |
| 12 | IR-filter | Plano | 0.300 | Glass | 1.516 | 64.1 | - |
| 13 | | Plano | 0.300 | | | | |
| 14 | Image | Plano | - | | | | |

Note: Reference wavelength is 587.6 nm. ASP stands for aspherical surfaces.

FIG. 11

Table 2
(Aspheric Coefficients)

| Surface # | 1 | 2 | 4 | 5 | 6 |
|---|---|---|---|---|---|
| k = | -1.70901E+00 | -4.22202E+01 | -1.20367E+01 | -1.22853E+02 | -1.00000E+00 |
| A4 = | -3.71443E-02 | -1.21072E-01 | 1.83488E-01 | 2.06881E-01 | -2.79778E-01 |
| A6 = | -5.39456E-02 | 1.62107E-02 | 1.46930E-02 | 3.97402E-02 | 2.00492E-01 |
| A8 = | -1.32869E-01 | 7.08267E-02 | 6.69742E-02 | 1.01329E-01 | -1.34415E-01 |
| A10 = | 1.09052E-01 | -2.69991E-01 | -1.52595E-01 | -2.09073E-01 | 1.83211E-01 |
| A12 = | -8.53056E-02 | 1.58747E-01 | 6.15943E-02 | 6.22587E-02 | -1.22743E-01 |

| Surface # | 7 | 8 | 9 | 10 | 11 |
|---|---|---|---|---|---|
| k = | -5.10148E+00 | 4.88759E+00 | -1.83509E+00 | -1.00000E+00 | -1.00000E+00 |
| A4 = | -1.38248E-01 | 6.77276E-02 | 5.92824E-02 | 4.64227E-03 | -1.40589E-01 |
| A6 = | 1.62565E-02 | 2.08445E-03 | -2.18737E-02 | -6.33447E-02 | 4.27990E-02 |
| A8 = | 3.94969E-02 | -5.30703E-02 | -3.68440E-03 | 2.47388E-02 | -1.30860E-02 |
| A10 = | -3.15934E-02 | 4.20965E-02 | 6.11646E-03 | -2.50493E-03 | 2.67468E-03 |
| A12 = | -1.39172E-04 | -1.20043E-02 | 1.38786E-03 | -1.26588E-04 | -3.01493E-04 |
| A14 = |  |  | -8.60956E-04 | 2.26940E-05 | 1.41181E-05 |

FIG. 12

Table 3
(Embodiment 2)
f = 3.90 mm, Fno = 2.15, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.948990 (ASP) | 0.549 | Plastic | 1.544 | 55.9 | 3.38 |
| 2 | | -30.131900 (ASP) | -0.095 | | | | |
| 3 | Ape. Stop | Plano | 0.268 | | | | |
| 4 | Lens 2 | -1.930410 (ASP) | 0.272 | Plastic | 1.634 | 23.8 | -4.71 |
| 5 | | -5.753100 (ASP) | 0.085 | | | | |
| 6 | Lens 3 | 1.262880 (ASP) | 0.332 | Plastic | 1.544 | 55.9 | 8.57 |
| 7 | | 1.571120 (ASP) | 0.756 | | | | |
| 8 | Lens 4 | -2.984040 (ASP) | 0.553 | Plastic | 1.544 | 55.9 | 2.81 |
| 9 | | -1.078170 (ASP) | 0.446 | | | | |
| 10 | Lens 5 | -3.242400 (ASP) | 0.285 | Plastic | 1.530 | 55.8 | -2.61 |
| 11 | | 2.493100 (ASP) | 0.700 | | | | |
| 12 | IR-filter | Plano | 0.300 | Glass | 1.516 | 64.1 | - |
| 13 | | Plano | 0.298 | | | | |
| 14 | Image | Plano | - | | | | |

Note: Reference wavelength is 587.6 nm. ASP stands for aspherical surfaces.

FIG. 13

Table 4
(Aspheric Coefficients)

| Surface # | 1 | 2 | 4 | 5 | 6 |
|---|---|---|---|---|---|
| k = | -1.83584E+00 | -3.66809E+03 | -1.23279E+01 | 8.49306E+00 | -1.00000E+00 |
| A4 = | -3.32830E-02 | -1.77095E-01 | 9.38938E-02 | 2.22995E-01 | -1.99291E-01 |
| A6 = | -6.85964E-03 | -3.78118E-02 | 6.46249E-04 | 3.02315E-02 | 2.06341E-01 |
| A8 = | -1.26146E-01 | 2.52494E-01 | 2.01231E-01 | 7.23321E-02 | -2.19390E-01 |
| A10 = | 6.17027E-02 | -2.74658E-01 | -2.43917E-01 | -2.37261E-01 | 1.47061E-01 |
| A12 = | -7.51020E-03 | 9.65576E-02 | 9.68343E-02 | 1.32614E-01 | -4.97035E-02 |

| Surface # | 7 | 8 | 9 | 10 | 11 |
|---|---|---|---|---|---|
| k = | -4.11924E-01 | 3.94272E+00 | -1.29095E+00 | -1.00000E+00 | -1.00000E+00 |
| A4 = | -7.53764E-02 | -3.21124E-02 | 6.74583E-02 | 7.61472E-02 | -1.17678E-01 |
| A6 = | -3.51678E-02 | 1.19083E-01 | -1.23535E-02 | -7.02798E-02 | 4.04195E-02 |
| A8 = | 2.99966E-02 | -1.07415E-01 | -1.73314E-03 | 2.41910E-02 | -1.43355E-02 |
| A10 = | -8.78429E-03 | 5.55552E-02 | 5.66609E-03 | -2.72356E-03 | 3.05983E-03 |
| A12 = | -6.11329E-03 | -1.42123E-02 | 6.94457E-04 | -1.32996E-04 | -3.45204E-04 |
| A14 = | | | -7.51945E-04 | 3.28795E-05 | 1.55277E-05 |

FIG. 14

Table 5

(Embodiment 3)

f = 3.86 mm, Fno = 2.40, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.181 | | | | |
| 2 | Lens 1 | 1.459250 (ASP) | 0.553 | Plastic | 1.544 | 55.9 | 3.05 |
| 3 | | 10.493500 (ASP) | 0.134 | | | | |
| 4 | Lens 2 | -2.107130 (ASP) | 0.285 | Plastic | 1.634 | 23.8 | -4.73 |
| 5 | | -7.462700 (ASP) | 0.060 | | | | |
| 6 | Lens 3 | 1.375770 (ASP) | 0.316 | Plastic | 1.544 | 55.9 | 11.25 |
| 7 | | 1.630850 (ASP) | 0.526 | | | | |
| 8 | Lens 4 | -2.506940 (ASP) | 0.469 | Plastic | 1.544 | 55.9 | 6.96 |
| 9 | | -1.607850 (ASP) | 0.285 | | | | |
| 10 | Lens 5 | 3.750400 (ASP) | 0.670 | Plastic | 1.544 | 55.9 | -6.54 |
| 11 | | 1.711440 (ASP) | 0.700 | | | | |
| 12 | IR-filter | Plano | 0.300 | Glass | 1.516 | 64.1 | - |
| 13 | | Plano | 0.307 | | | | |
| 14 | Image | Plano | - | | | | |

Note: Reference wavelength is 587.6 nm. ASP stands for aspherical surfaces.

FIG. 15

Table 6

(Aspheric Coefficients)

| Surface # | 2 | 3 | 4 | 5 | 6 |
|---|---|---|---|---|---|
| k = | -4.66345E-01 | -1.00000E+00 | -1.50000E+01 | 4.50465E-01 | -1.00000E+00 |
| A4 = | -3.32606E-03 | -8.82562E-02 | 1.61248E-01 | 2.49373E-01 | -2.65146E-01 |
| A6 = | -1.53059E-02 | -6.09860E-02 | -1.33249E-01 | 3.50901E-02 | 2.30113E-01 |
| A8 = | -4.66355E-02 | -1.73096E-02 | 1.41643E-01 | 5.56783E-02 | -2.64472E-01 |
| A10 = | 3.89145E-02 | 9.57668E-02 | -3.14531E-02 | -1.45560E-01 | 2.05459E-01 |
| A12 = | -9.12694E-02 | -9.24094E-02 | 6.82046E-03 | 1.10946E-01 | -1.03335E-01 |

| Surface # | 7 | 8 | 9 | 10 | 11 |
|---|---|---|---|---|---|
| k = | -5.34163E-01 | -1.05496E+01 | -3.62336E+00 | -1.00000E+00 | -1.00000E+00 |
| A4 = | -1.02911E-01 | 6.99271E-02 | 2.53006E-02 | -1.31617E-01 | -1.91418E-01 |
| A6 = | -7.75838E-02 | -7.82146E-02 | -6.82980E-02 | -2.24086E-02 | 7.01814E-02 |
| A8 = | 8.93758E-02 | -8.46262E-02 | 1.35477E-02 | 2.84424E-02 | -2.32822E-02 |
| A10 = | -4.24624E-02 | 1.51661E-01 | 1.78009E-02 | -5.09238E-03 | 5.07382E-03 |
| A12 = | -1.07596E-02 | -6.99769E-02 | -3.70721E-04 | -1.57634E-04 | -6.29221E-04 |
| A14 = | | | -2.11268E-03 | 7.69522E-05 | 3.29467E-05 |

FIG. 16

Table 7
(Embodiment 4)
f = 4.14 mm, Fno = 2.40, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.175 | | | | |
| 2 | Lens 1 | 1.666230 (ASP) | 0.551 | Plastic | 1.544 | 55.9 | 3.18 |
| 3 | | 40.650400 (ASP) | 0.192 | | | | |
| 4 | Lens 2 | -1.590850 (ASP) | 0.258 | Plastic | 1.632 | 23.4 | -4.68 |
| 5 | | -3.656300 (ASP) | 0.070 | | | | |
| 6 | Lens 3 | 1.333570 (ASP) | 0.292 | Plastic | 1.544 | 55.9 | 11.51 |
| 7 | | 1.563630 (ASP) | 0.640 | | | | |
| 8 | Lens 4 | -2.219210 (ASP) | 0.596 | Plastic | 1.544 | 55.9 | 3.65 |
| 9 | | -1.147380 (ASP) | 0.533 | | | | |
| 10 | Lens 5 | -14.368900 (ASP) | 0.369 | Plastic | 1.530 | 55.8 | -3.48 |
| 11 | | 2.133550 (ASP) | 0.700 | | | | |
| 12 | IR-filter | Plano | 0.300 | Glass | 1.516 | 64.1 | - |
| 13 | | Plano | 0.401 | | | | |
| 14 | Image | Plano | - | | | | |

Note: Reference wavelength is 587.6 nm. ASP stands for aspherical surfaces.

FIG. 17

Table 8

(Aspheric Coefficients)

| Surface # | 2 | 3 | 4 | 5 | 6 |
|---|---|---|---|---|---|
| k = | -5.70262E-01 | -1.00000E+00 | -1.43808E+01 | -6.89350E+01 | -1.00000E+00 |
| A4 = | -1.24277E-02 | -7.59757E-02 | 1.17780E-01 | 1.94673E-01 | -2.76600E-01 |
| A6 = | -2.69029E-03 | -3.89587E-02 | -1.51635E-02 | 1.12955E-02 | 2.04044E-01 |
| A8 = | -8.71657E-02 | -2.81421E-02 | 2.47510E-02 | 8.66403E-02 | -2.15700E-01 |
| A10 = | 6.29949E-02 | 5.92618E-02 | -1.80172E-03 | -9.53269E-02 | 1.56364E-01 |
| A12 = | -5.99679E-02 | -4.58735E-02 | 8.62023E-04 | 2.64851E-02 | -4.30733E-02 |

| Surface # | 7 | 8 | 9 | 10 | 11 |
|---|---|---|---|---|---|
| k = | -9.95214E-01 | -5.21513E-01 | -1.72375E+00 | 0.00000E+00 | -1.00000E+00 |
| A4 = | -1.10501E-01 | 4.01365E-02 | 4.02716E-02 | -5.66269E-03 | -1.46286E-01 |
| A6 = | -5.02813E-02 | 3.88333E-02 | -3.17584E-02 | -6.50652E-02 | 4.26594E-02 |
| A8 = | 5.88937E-02 | -1.45169E-01 | -1.07683E-02 | 2.80636E-02 | -1.43262E-02 |
| A10 = | -3.26135E-02 | 1.38749E-01 | 9.27628E-03 | -3.02294E-03 | 3.43785E-03 |
| A12 = | 4.85771E-03 | -5.11231E-02 | 7.94905E-03 | -2.36111E-04 | -4.69331E-04 |
| A14 = | | -3.32088E-03 | | 4.49395E-05 | 2.76270E-05 |

FIG. 18

Table 9
(Embodiment 5)
f = 3.72 mm, Fno = 2.50, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.938250 (ASP) | 0.461 | Plastic | 1.544 | 55.9 | 2.61 |
| 2 | | -4.871300 (ASP) | -0.062 | | | | |
| 3 | Ape. Stop | Plano | 0.163 | | | | |
| 4 | Lens 2 | -1.998310 (ASP) | 0.265 | Plastic | 1.634 | 23.8 | -9.35 |
| 5 | | -3.169200 (ASP) | 0.083 | | | | |
| 6 | Lens 3 | 2.135120 (ASP) | 0.265 | Plastic | 1.634 | 23.8 | -9.31 |
| 7 | | 1.492540 (ASP) | 0.536 | | | | |
| 8 | Lens 4 | -3.209000 (ASP) | 0.781 | Plastic | 1.544 | 55.9 | 2.85 |
| 9 | | -1.136050 (ASP) | 0.587 | | | | |
| 10 | Lens 5 | -5.169700 (ASP) | 0.320 | Plastic | 1.530 | 55.8 | -2.80 |
| 11 | | 2.125200 (ASP) | 0.600 | | | | |
| 12 | IR-filter | Plano | 0.300 | Glass | 1.516 | 64.1 | - |
| 13 | | Plano | 0.302 | | | | |
| 14 | Image | Plano | - | | | | |

Note: Reference wavelength is 587.6 nm. ASP stands for aspherical surfaces.

FIG. 19

Table 10
(Aspheric Coefficients)

| Surface # | 1 | 2 | 4 | 5 | 6 |
|---|---|---|---|---|---|
| k = | -1.51275E+00 | -6.52336E+01 | -1.50000E+01 | -1.46453E+01 | -1.00000E+00 |
| A4 = | -3.32114E-02 | -1.21200E-01 | 1.02116E-01 | 1.24400E-01 | -3.29303E-01 |
| A6 = | -5.88945E-02 | -3.21158E-02 | -1.35585E-02 | -3.04111E-02 | 2.21663E-01 |
| A8 = | -1.01338E-01 | 8.33409E-02 | 2.39584E-01 | 1.98619E-01 | -1.20897E-01 |
| A10 = | -9.43412E-02 | -1.07290E-01 | -5.13668E-02 | -5.39463E-02 | 2.44179E-01 |
| A12 = | 9.80331E-02 | 3.25816E-02 | -1.23322E-01 | -1.19423E-01 | -1.91461E-01 |

| Surface # | 7 | 8 | 9 | 10 | 11 |
|---|---|---|---|---|---|
| k = | -3.65071E+00 | 1.81593E+00 | -1.93418E+00 | -1.00000E+00 | -1.00000E+00 |
| A4 = | -1.08916E-01 | 4.12958E-02 | 2.09581E-02 | 2.00432E-02 | -1.31798E-01 |
| A6 = | 5.78033E-02 | 3.30864E-02 | -2.10627E-02 | -6.39086E-02 | 4.01887E-02 |
| A8 = | 6.13551E-02 | -5.07341E-02 | 2.98951E-03 | 2.44844E-02 | -1.32456E-02 |
| A10 = | -4.24570E-02 | 3.87739E-02 | 8.01520E-03 | -2.54296E-03 | 2.72303E-03 |
| A12 = | 4.63358E-03 | -1.17902E-02 | 1.39358E-03 | -1.35194E-04 | -2.99151E-04 |
| A14 = | | | -1.50998E-03 | 2.57971E-05 | 1.35187E-05 |

FIG. 20

Table 11
(Embodiment 6)
f = 3.90 mm, Fno = 2.70, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.752640 (ASP) | 0.414 | Plastic | 1.544 | 55.9 | 3.52 |
| 2 | | 18.687300 (ASP) | -0.034 | | | | |
| 3 | Ape. Stop | Plano | 0.202 | | | | |
| 4 | Lens 2 | -3.285200 (ASP) | 0.260 | Plastic | 1.650 | 21.4 | -9.77 |
| 5 | | -7.019900 (ASP) | 0.113 | | | | |
| 6 | Lens 3 | 1.889220 (ASP) | 0.452 | Plastic | 1.544 | 55.9 | -55.46 |
| 7 | | 1.628020 (ASP) | 0.538 | | | | |
| 8 | Lens 4 | -4.256700 (ASP) | 0.571 | Plastic | 1.544 | 55.9 | 3.87 |
| 9 | | -1.476040 (ASP) | 0.508 | | | | |
| 10 | Lens 5 | 5.735300 (ASP) | 0.469 | Plastic | 1.544 | 55.9 | -3.84 |
| 11 | | 1.488530 (ASP) | 0.500 | | | | |
| 12 | IR-filter | Plano | 0.300 | Glass | 1.516 | 64.1 | - |
| 13 | | Plano | 0.403 | | | | |
| 14 | Image | Plano | - | | | | |

Note: Reference wavelength is 587.6 nm. ASP stands for aspherical surfaces.

FIG. 21

Table 12
(Aspheric Coefficients)

| Surface # | 1 | 2 | 4 | 5 | 6 |
|---|---|---|---|---|---|
| k = | -3.80546E+00 | -4.14827E+01 | 7.77812E+00 | 6.50901E+01 | -1.00000E+00 |
| A4 = | -2.27056E-02 | -2.69212E-01 | 2.14052E-01 | 3.38455E-01 | -1.26478E-01 |
| A6 = | -1.00476E-01 | -1.38718E-01 | 1.78738E-01 | 2.39609E-01 | 9.37190E-02 |
| A8 = | -3.00140E-01 | 5.74214E-01 | -5.33267E-03 | -1.32179E-01 | -1.08128E-01 |
| A10 = | 2.67819E-01 | -7.35237E-01 | 2.72644E-02 | -3.14841E-01 | 4.76127E-02 |
| A12 = | -1.14683E-01 | 3.03867E-01 | -1.04182E-01 | 4.05427E-01 | -3.41862E-02 |

| Surface # | 7 | 8 | 9 | 10 | 11 |
|---|---|---|---|---|---|
| k = | -2.00183E+00 | 3.41474E+00 | -1.16042E+00 | -1.00000E+00 | -1.00000E+00 |
| A4 = | -1.01956E-01 | 8.95580E-02 | 1.18589E-01 | -6.32946E-02 | -1.86696E-01 |
| A6 = | 3.41358E-02 | -4.43640E-02 | -6.12893E-02 | -4.08483E-02 | 6.17700E-02 |
| A8 = | -1.44637E-02 | -7.60669E-02 | -2.53907E-02 | 2.27052E-02 | -1.79171E-02 |
| A10 = | -2.48738E-03 | 1.07336E-01 | 2.81231E-02 | -2.95225E-03 | 3.34312E-03 |
| A12 = | -8.90388E-03 | -3.68657E-02 | 4.25352E-03 | -6.81027E-05 | -3.56984E-04 |
| A14 = | | | -3.63236E-03 | 2.57594E-05 | 1.71583E-05 |

FIG. 22

Table 13
(Embodiment 7)
f = 4.21 mm, Fno = 2.40, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.195 | | | | |
| 2 | Lens 1 | 1.619480 (ASP) | 0.584 | Plastic | 1.544 | 55.9 | 2.71 |
| 3 | | -14.270600 (ASP) | 0.100 | | | | |
| 4 | Lens 2 | -1.968230 (ASP) | 0.250 | Plastic | 1.632 | 23.4 | -8.25 |
| 5 | | -3.318100 (ASP) | 0.050 | | | | |
| 6 | Lens 3 | 2.293140 (ASP) | 0.270 | Plastic | 1.632 | 23.4 | -13.29 |
| 7 | | 1.719070 (ASP) | 0.595 | | | | |
| 8 | Lens 4 | -2.585570 (ASP) | 0.797 | Plastic | 1.544 | 55.9 | 3.25 |
| 9 | | -1.164750 (ASP) | 0.534 | | | | |
| 10 | Lens 5 | -4.427100 (ASP) | 0.320 | Plastic | 1.530 | 55.8 | -3.03 |
| 11 | | 2.586540 (ASP) | 0.700 | | | | |
| 12 | IR-filter | Plano | 0.300 | Glass | 1.516 | 64.1 | - |
| 13 | | Plano | 0.400 | | | | |
| 14 | Image | Plano | - | | | | |

Note: Reference wavelength is 587.6 nm. ASP stands for aspherical surfaces.

FIG. 23

Table 14

(Aspheric Coefficients)

| Surface # | 2 | 3 | 4 | 5 | 6 |
|---|---|---|---|---|---|
| k = | -4.60552E-01 | 6.52969E+00 | -1.50000E+01 | -2.26711E+01 | -1.00000E+00 |
| A4 = | -7.39059E-03 | -5.27091E-02 | 1.00998E-01 | 1.26321E-01 | -3.19896E-01 |
| A6 = | 4.25128E-03 | 3.04184E-02 | -3.17873E-02 | -1.15835E-01 | 1.38464E-01 |
| A8 = | -9.03941E-02 | -7.58523E-02 | 3.52256E-02 | 9.50047E-02 | -1.40895E-01 |
| A10 = | 9.78402E-02 | 1.12215E-02 | -2.29037E-03 | -1.32306E-04 | 1.91411E-01 |
| A12 = | -9.90793E-02 | -1.17101E-02 | 5.97076E-03 | -1.70465E-03 | -5.23760E-02 |

| Surface # | 7 | 8 | 9 | 10 | 11 |
|---|---|---|---|---|---|
| k = | -4.23313E+00 | 2.77301E+00 | -2.16079E+00 | 0.00000E+00 | -1.00000E+00 |
| A4 = | -1.03366E-01 | 1.49939E-02 | -9.24688E-03 | 1.32079E-02 | -1.31090E-01 |
| A6 = | 2.32574E-02 | 5.57200E-02 | -7.32549E-03 | -5.96632E-02 | 3.92017E-02 |
| A8 = | 8.83024E-02 | -1.45332E-01 | -1.20051E-02 | 2.51161E-02 | -1.29455E-02 |
| A10 = | -6.32797E-02 | 1.42882E-01 | 3.74761E-03 | -2.68861E-03 | 2.90957E-03 |
| A12 = | 3.94591E-02 | -5.27635E-02 | 7.99873E-03 | -2.56545E-04 | -3.70721E-04 |
| A14 = | | | -3.02003E-03 | 4.84045E-05 | 1.98429E-05 |

FIG. 24

Table 15
(Embodiment 8)
f = 3.87 mm, Fno = 2.60, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.170 | | | | |
| 2 | Lens 1 | 1.402740 (ASP) | 0.483 | Plastic | 1.544 | 55.9 | 3.04 |
| 3 | | 8.165300 (ASP) | 0.204 | | | | |
| 4 | Lens 2 | -2.026500 (ASP) | 0.246 | Plastic | 1.650 | 21.4 | -5.69 |
| 5 | | -4.701000 (ASP) | 0.076 | | | | |
| 6 | Lens 3 | 1.465240 (ASP) | 0.268 | Plastic | 1.544 | 55.9 | 13.34 |
| 7 | | 1.717320 (ASP) | 0.553 | | | | |
| 8 | Lens 4 | -1.815950 (ASP) | 0.522 | Plastic | 1.544 | 55.9 | 26.62 |
| 9 | | -1.777080 (ASP) | 0.082 | | | | |
| 10 | Lens 5 | 2.248470 (ASP) | 0.766 | Plastic | 1.544 | 55.9 | -19.56 |
| 11 | | 1.633500 (ASP) | 0.700 | | | | |
| 12 | IR-filler | Plano | 0.300 | Glass | 1.516 | 64.1 | - |
| 13 | | Plano | 0.403 | | | | |
| 14 | Image | Plano | - | | | | |

Note: Reference wavelength is 587.6 nm. ASP stands for aspherical surfaces.

FIG. 25

Table 16

(Aspheric Coefficients)

| Surface # | 2 | 3 | 4 | 5 | 6 |
|---|---|---|---|---|---|
| k = | -3.99028E-01 | -1.00000E+00 | -1.50000E+01 | -1.17422E+01 | -1.00000E+00 |
| A4 = | -2.99665E-03 | -7.24525E-02 | 1.62336E-01 | 2.42511E-01 | -3.12226E-01 |
| A6 = | -3.21398E-02 | -1.13457E-01 | -1.21968E-01 | 3.29031E-02 | 2.28422E-01 |
| A8 = | -6.14508E-02 | -8.84799E-02 | 1.18145E-01 | 1.18053E-01 | -2.87020E-01 |
| A10 = | 2.01798E-02 | 1.54068E-01 | 1.00449E-01 | -8.67594E-02 | 2.06575E-01 |
| A12 = | -1.52996E-01 | -9.68135E-02 | -4.30472E-02 | 1.12334E-01 | -9.40243E-02 |

| Surface # | 7 | 8 | 9 | 10 | 11 |
|---|---|---|---|---|---|
| k = | -9.98832E-01 | -1.01345E+01 | -5.09176E+00 | -1.00000E+00 | -1.00000E+00 |
| A4 = | -1.24296E-01 | 5.93398E-02 | -5.01931E-02 | -2.36322E-01 | -2.06029E-01 |
| A6 = | -8.77757E-02 | -1.21631E-01 | -6.12860E-02 | 3.01891E-03 | 6.90158E-02 |
| A8 = | 1.07401E-01 | -6.91022E-02 | 2.04182E-02 | 3.01526E-02 | -2.01007E-02 |
| A10 = | -6.81984E-02 | 1.89533E-01 | 1.58465E-02 | -5.30852E-03 | 3.92309E-03 |
| A12 = | -3.52601E-03 | -1.02199E-01 | 1.41301E-03 | -4.20160E-04 | -4.67780E-04 |
| A14 = | | | -2.90523E-03 | 9.74461E-05 | 2.53953E-05 |

FIG. 26

Table 17

(Embodiment 9)

f = 3.81 mm, Fno = 2.70, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.650750 (ASP) | 0.459 | Plastic | 1.544 | 55.9 | 2.57 |
| 2 | | -8.221500 (ASP) | -0.056 | | | | |
| 3 | Ape. Stop | Plano | 0.202 | | | | |
| 4 | Lens 2 | -1.769130 (ASP) | 0.223 | Plastic | 1.634 | 23.8 | -5.39 |
| 5 | | -3.848400 (ASP) | 0.100 | | | | |
| 6 | Lens 3 | 1.479190 (ASP) | 0.245 | Plastic | 1.544 | 55.9 | -57.68 |
| 7 | | 1.330170 (ASP) | 0.501 | | | | |
| 8 | Lens 4 | -2.265110 (ASP) | 0.570 | Plastic | 1.544 | 55.9 | 4.12 |
| 9 | | -1.226380 (ASP) | 0.534 | | | | |
| 10 | Lens 5 | 19.116800 (ASP) | 0.522 | Plastic | 1.544 | 55.9 | -3.75 |
| 11 | | 1.826820 (ASP) | 0.500 | | | | |
| 12 | IR-filter | Plano | 0.300 | Glass | 1.516 | 64.1 | - |
| 13 | | Plano | 0.402 | | | | |
| 14 | Image | Plano | - | | | | |

Note: Reference wavelength is 587.6 nm. ASP stands for aspherical surfaces.

FIG. 27

Table 18

(Aspheric Coefficients)

| Surface # | 1 | 2 | 4 | 5 | 6 |
|---|---|---|---|---|---|
| k = | -2.43000E+00 | 1.78851E+01 | -4.67337E+00 | -2.81490E+01 | -1.00000E+00 |
| A4 = | -2.30225E-02 | -2.37904E-01 | 3.88403E-01 | 5.03465E-01 | -2.04724E-01 |
| A6 = | -9.96520E-02 | 1.90908E-01 | 8.03209E-02 | 2.00284E-02 | 9.82030E-03 |
| A8 = | -2.01963E-01 | -1.22854E-01 | -3.77809E-01 | -3.18953E-01 | -7.76990E-02 |
| A10 = | 1.47809E-02 | -1.94950E-01 | 5.11011E-01 | 9.11540E-02 | 1.97048E-01 |
| A12 = | 4.33339E-02 | 1.97714E-01 | -1.95316E-01 | 2.40485E-01 | -2.45521E-01 |

| Surface # | 7 | 8 | 9 | 10 | 11 |
|---|---|---|---|---|---|
| k = | -1.71987E+00 | 2.56996E+00 | -1.34241E+00 | -1.00000E+00 | -1.00000E+00 |
| A4 = | -1.33820E-01 | 1.62928E-01 | 1.08720E-01 | -3.15716E-02 | -1.57687E-01 |
| A6 = | -2.07114E-02 | -3.72286E-02 | -5.81243E-02 | -4.50713E-02 | 5.40932E-02 |
| A8 = | 3.77924E-02 | -5.50965E-02 | -9.46483E-03 | 2.25399E-02 | -1.76013E-02 |
| A10 = | -1.45614E-02 | 1.20725E-01 | 3.04412E-02 | -2.93569E-03 | 3.42002E-03 |
| A12 = | -2.79119E-02 | -4.81980E-02 | 2.99486E-03 | -7.26603E-05 | -3.46446E-04 |
| A14 = | | | -5.11752E-03 | 2.71965E-05 | 1.43379E-05 |

FIG. 28

Table 19
(Embodiment 10)
f = 3.59 mm, Fno = 2.60, HFOV = 38.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 8.791142 (ASP) | 0.459 | Glass | 1.618 | 63.3 | 2.77 |
| 2 | | -2.081875 (ASP) | -0.137 | | | | |
| 3 | Ape. Stop | Plano | 0.333 | | | | |
| 4 | Lens 2 | -2.608680 (ASP) | 0.291 | Plastic | 1.634 | 23.8 | -5.34 |
| 5 | | -11.885947 (ASP) | 0.126 | | | | |
| 6 | Lens 3 | 2.828668 (ASP) | 0.291 | Plastic | 1.544 | 55.9 | -29.39 |
| 7 | | 2.316426 (ASP) | 0.595 | | | | |
| 8 | Lens 4 | -4.698222 (ASP) | 0.635 | Plastic | 1.544 | 55.9 | 2.95 |
| 9 | | -1.254166 (ASP) | 0.538 | | | | |
| 10 | Lens 5 | 6.096749 (ASP) | 0.468 | Plastic | 1.530 | 55.8 | -3.30 |
| 11 | | 1.323801 (ASP) | 0.700 | | | | |
| 12 | IR-filter | Plano | 0.300 | Glass | 1.516 | 64.1 | - |
| 13 | | Plano | 0.300 | | | | |
| 14 | Image | Plano | - | | | | |

Note: Reference wavelength is 587.6 nm. ASP stands for aspherical surfaces.

FIG. 29

Table 20
(Aspheric Coefficients)

| Surface # | 1 | 2 | 4 | 5 | 6 |
|---|---|---|---|---|---|
| k = | -1.67560E+02 | -1.02041E+01 | -1.50000E+01 | -6.66618E+01 | -1.00000E+00 |
| A4 = | -1.12134E-01 | -1.74347E-01 | 2.88030E-01 | 2.58047E-01 | -2.44415E-01 |
| A6 = | -8.38091E-02 | 2.24968E-02 | -1.13167E-01 | -2.46088E-02 | 2.13438E-01 |
| A8 = | -4.81261E-02 | 2.28814E-01 | -4.90899E-02 | -7.34646E-03 | -1.04664E-01 |
| A10 = | 1.03559E-01 | -7.77871E-01 | -6.84411E-03 | -8.83059E-02 | 8.06091E-02 |
| A12 = | -1.32545E-01 | 6.11736E-01 | 7.39646E-03 | 3.99406E-02 | -3.57587E-02 |

| Surface # | 7 | 8 | 9 | 10 | 11 |
|---|---|---|---|---|---|
| k = | -7.14950E+00 | 1.18495E+01 | -2.05409E+00 | -1.00000E+00 | -1.00000E+00 |
| A4 = | -1.24485E-01 | 1.14046E-01 | 7.09250E-02 | -2.59051E-02 | -1.72027E-01 |
| A6 = | 3.97075E-03 | 1.52600E-02 | -9.06948E-03 | -6.12598E-02 | 4.97036E-02 |
| A8 = | 1.51229E-02 | -6.15072E-02 | -3.58348E-04 | 2.50846E-02 | -1.34975E-02 |
| A10 = | -2.77410E-02 | 4.00722E-02 | 4.61276E-03 | -2.60046E-03 | 2.65273E-03 |
| A12 = | 9.21401E-03 | -9.40850E-03 | 3.32807E-04 | -1.00327E-04 | -3.09043E-04 |
| A14 = | | | -7.67122E-04 | 1.80054E-05 | 1.54983E-05 |

FIG. 30

Table 21

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f(mm) | 4.05 | 3.90 | 3.86 | 4.14 | 3.72 | 3.90 | 4.21 | 3.87 | 3.81 | 3.59 |
| Fno | 2.60 | 2.15 | 2.40 | 2.40 | 2.50 | 2.70 | 2.40 | 2.60 | 2.70 | 2.60 |
| HFOV | 34.8 | 35.8 | 36.3 | 34.5 | 37.3 | 36.0 | 34.1 | 36.2 | 36.6 | 38.1 |
| V1-V2 | 32.1 | 32.1 | 32.1 | 32.5 | 32.1 | 34.5 | 32.5 | 34.5 | 32.1 | 39.5 |
| N1-N2 | -0.090 | -0.090 | -0.090 | -0.088 | -0.090 | -0.106 | -0.088 | -0.106 | -0.090 | -0.016 |
| CT4/f | 0.17 | 0.14 | 0.12 | 0.14 | 0.21 | 0.15 | 0.19 | 0.14 | 0.15 | 0.18 |
| T34/T45 | 0.87 | 1.70 | 1.85 | 1.20 | 0.91 | 1.06 | 1.11 | 6.74 | 0.94 | 1.11 |
| (R3+R4)/(R3-R4) | -1.62 | -2.01 | -1.79 | -2.54 | -4.41 | -2.76 | -3.92 | -2.52 | -2.70 | -1.56 |
| (\|R5\|+\|R6\|)/f | 1.22 | 0.73 | 0.78 | 0.70 | 0.98 | 0.90 | 0.95 | 0.82 | 0.74 | 1.43 |
| f/f4 | 1.34 | 1.39 | 0.55 | 1.13 | 1.31 | 1.01 | 1.30 | 0.15 | 0.93 | 1.22 |
| \|f1/f3\| | 0.10 | 0.39 | 0.27 | 0.28 | 0.28 | 0.06 | 0.20 | 0.23 | 0.04 | 0.09 |
| \|f/f4\|+\|f/f5\| | 2.83 | 2.88 | 1.15 | 2.32 | 2.63 | 2.02 | 2.68 | 0.34 | 1.94 | 2.30 |
| TTL/ImgH | 1.69 | 1.64 | 1.59 | 1.69 | 1.59 | 1.62 | 1.69 | 1.59 | 1.55 | 1.69 |

FIG. 31

IMAGE PICKUP OPTICAL LENS ASSEMBLY

BACKGROUND OF THE INVENTION

1. Field of the Invention

The present invention relates to an image pickup optical lens assembly, and more particularly to a low-priced optical lens assembly comprised of five lens elements that constitute the total length of the optical lens assembly and applied to an electronic product.

2. Description of the Related Art

As science and technology advance, the development of electronic products such as digital cameras, web cameras or mobile phone cameras tends to have a compact design to meet the user requirements for an optical lens assembly with good aberration correction ability, high resolution, and high image quality.

In general, a conventional optical lens assembly of a mini electronic product comes with different designs, including the two-lens, three-lens, four-lens, and five-or-more lens designs. If the image quality is taken into consideration, the optical lens assemblies with the four-lens and five-lens designs have advantages on aberration correction and modulation transfer function (MTF), and the five-lens design having a higher resolution than the four-lens design is applicable for electronic products of high video quality or high pixel requirement.

In various mini five-lens designs of an image pickup optical system with a fixed focal length, different combinations of positive and negative refractive powers are adopted. As disclosed in Japanese Pat. Publication Nos. JP2006-293042 and JP2005-266771, U.S. Pat. Publication Nos. US2004/0196571 and US2003/0117722, and R.O.C. Pat. No. TW M313781 adopt two sets of cemented doublet lenses to shorten the focal length of the optical system, but the two adjacent optical surfaces must adopt the same curvature and incurs a high level of difficulty for the optical design or aberration correction, and thus the application is very limited.

In small products such as digital camera, web camera, and mobile phone camera, the optical lens assembly requires a compact design, a short focal length and a good aberration correction. For different designs of the image pickup optical systems with a fixed focal length and five lens elements, a better aberration correction and an appropriate total length can be achieved by designing the fourth and fifth lens elements with different refractive powers. In particular, the optical system with a five-lens structure can meet the high pixel requirement, as disclosed in R.O.C. Pat. Nos. TW I329755, TW201038966 and TWM332199 and U.S. Pat. No. 7,710,665, and such optical systems tend to have a good aberration correction, but the total length of the optical systems still cannot meet the application requirements of a small electronic device. In a design adopting the fifth lens element with an inflection point and a shorter focal length as disclosed in U.S. Pat. No. 7,826,151, US2010/0254029, and US2010/0253829. The prior art adopts the fifth lens element with an inflection point to correct aberration or distortion. However, it is necessary to have a greater distance between the third lens element and the fourth lens element, which is unfavorable to the design for a shorter total length; or for the purpose of achieving a shorter total length, the distance between the fourth lens element and the fifth lens element is shortened too short, where the aberration correction will be difficult. Therefore, the present invention provides a feasible design to shorten the optical lens assembly, while using the refractive power of the five lens elements and the combination of convex and concave surfaces to improve the image quality for the application on compact electronic devices, in addition to the effect of reducing the total length of the optical lens assembly.

SUMMARY OF THE INVENTION

Therefore, it is a primary objective of the invention to provide an image pickup optical lens assembly, sequentially arranged from an object side to an image side along an optical axis, comprises the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element assigned with positive refractive power or negative refractive power in different applications; the fourth lens element with positive refractive power has a concave object-side surface and a convex image-side surface; and the fifth lens element with negative refractive power has a concave image-side surface, and both object-side surface and image-side surface are aspheric, and the image-side surface of the fifth lens element includes at least one inflection point. The image pickup optical lens assembly satisfies the following relations:

$$-6.0 < (R_3+R_4)/(R_3-R_4) < -1.0 \quad (1)$$

$$0.3 < T_{34}/T_{45} < 2.5 \quad (2)$$

$$-0.25 < N_1 - N_2 \leq 0 \quad (3)$$

Wherein, $R_3$ is the curvature radius of the object-side surface of the second lens element, $R_4$ is the curvature radius of the image-side surface of the second lens element, $T_{34}$ is the axial distance from the image-side surface of the third lens element to the object-side surface of the fourth lens element, $T_{45}$ is the axial distance from the image-side surface of the image-side surface of the fourth lens element to the object-side surface of the fifth lens element, $N_1$ is the refractive index of the first lens element, and $N_2$ is the refractive index of the second lens element.

Another objective of the present invention is to provide an image pickup optical lens assembly as described above and further comprising an image sensor installed at a position at an image surface after the first lens element, second lens element, third lens element, fourth lens element and fifth lens element are assembled. The image pickup optical lens assembly also satisfies the following relation, in addition to Relations (1), (2) and (3):

$$TTL/\text{Img}H < 2.0 \quad (4)$$

Wherein, TTL is the distance from the object-side surface of the first lens element to the image plane along the optical axis, and ImgH is half of the diagonal length of an effective photosensitive area of the image sensor.

Another objective of the present invention is to provide an image pickup optical lens assembly, sequentially arranged from an object side to an image side along an optical axis, comprising the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element assigned to have positive refractive power or negative refractive power for different applications, has a concave image-side surface; the fourth lens element with positive refractive power and made of a plastic material has a concave object-side surface and a convex image-side surface, and both object-side surface and image-side surface are aspheric; and the fifth lens element with negative refractive power and made of a plastic material has a concave image-side surface, and both object-side surface and image-side surface are aspheric, and the image-side surface of the fifth lens element has at least one inflection point. For the purpose of different applications, the image pickup optical lens assembly also satisfies one or a combination of the following relations, in addition to Relations (1), (2) and (3): (1), $$|f_1/f_3|<0.75 \qquad (5)$$

$$28<v_1-v_2<45 \qquad (6)$$

$$\text{Preferably, } -4.0<(R_3+R_4)/(R_3-R_4)<-1.0; \qquad (7)$$

$$0<f/f_4<2.0, \qquad (8)$$

$$(|R_5|+|R_6|)/f<4.0 \qquad (9)$$

$$\text{Preferably, } (|R_5|+|R_6|)/f<2.0 \qquad (14)$$

$$0.04<CT_4/f<0.20 \qquad (10)$$

$$|f/f_4|+|f/f_5|<3.5 \qquad (11)$$

$$\text{Preferably, } |f_1/f_3|<0.5, \text{ or} \qquad (12)$$

$$\text{Preferably, } |f_1/f_3|<0.35 \qquad (13)$$

Wherein, $T_{34}$ is axial the distance from the image-side surface of the third lens element to the object-side surface of the fourth lens element, $T_{45}$ is the axial distance from the image-side surface of the fourth lens element to the object-side surface of the fifth lens element, $CT_4$ is the thickness of the fourth lens element along the optical axis, $v_1$ is the Abbe number of the first lens element, $v_2$ is the Abbe number of the second lens element, f is the focal length of the image pickup optical lens assembly, $f_1$ is the focal length of the first lens element, $f_3$ is the focal length of the third lens element, $f_4$ is the focal length of the fourth lens element, $f_5$ is the focal length of the fifth lens element, $R_3$ is the curvature radius of the object-side surface of the second lens element, $R_4$ is the curvature radius of the image-side surface of the second lens element, $R_5$ is the curvature radius of the object-side surface of the third lens element, and $R_6$ is the curvature radius of the image-side surface of the third lens element.

Another objective of the present invention is to provide an image pickup optical lens assembly, sequentially arranged from an object side to an image side along an optical axis, comprising the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element has negative refractive power; the fourth lens element with refractive power and made of a plastic material has a concave object-side surface and a convex image-side surface, and both object-side surface and image-side surface are aspheric; and the fifth lens element with refractive power and made of a plastic material has a concave image-side surface, and both object-side surface and image-side surface are aspheric, and the image-side surface of the fifth lens element has at least one inflection point. The image pickup optical lens assembly satisfies the following relations:

$$-6.0<(R_3+R_4)/(R_3-R_4)<-1.0, \text{ and} \qquad (1)$$

$$|f_1/f_3|<0.75 \qquad (5)$$

Wherein, $R_3$ is the curvature radius of the object-side surface of the second lens element, $R_4$ is the curvature radius of the image-side surface of the second lens element, f is the focal length of the image pickup optical lens assembly, $f_1$ is the focal length of the first lens element, and $f_3$ is the focal length of the third lens element.

Another objective of the present invention is to provide an image pickup optical lens assembly as described above. For the purpose of different applications, the image pickup optical lens assembly satisfies one or a combination of the following equations, in addition to Equations (1) and (5):

$$\text{Preferably, } |f_1/f_3|<0.5 \qquad (12)$$

$$28<v_1-v_2<45 \qquad (6)$$

Wherein, $f_1$ is the focal length of the first lens element, $f_3$ is the focal length of the third lens element, $v_1$ is the Abbe number of the first lens element, and $v_2$ is the Abbe number of the second lens element.

Another objective of the present invention is to provide an image pickup optical lens assembly, sequentially arranged from an object side to an image side along an optical axis, comprising the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element with negative refractive power has a concave image-side surface; the fourth lens element with positive refractive power is made of a plastic material and has a concave object-side surface and a convex image-side surface, and both object-side surface and image-side surface are aspheric; and the fifth lens element with negative refractive power has a concave image-side surface, and both object-side surface and image-side surface are aspheric, and the image-side surface of the fifth lens element has at least one inflection point. For the purpose of different applications, the image pickup optical lens assembly satisfies one or a combination of the following equations, in addition to Equations (1), (5) and (12):

$$(|R_5|+|R_6|)/f<4.0 \qquad (9)$$

$$\text{Preferably, } |f_1/f_3|<0.35 \qquad (15)$$

$$0.04<CT_4/f<0.20 \qquad (10)$$

Wherein, $R_5$ is the curvature radius of the object-side surface of the third lens element, $R_6$ is the curvature radius of the image-side surface of the third lens element, $CT_4$ is the thickness of the fourth lens element along the optical axis, f is the focal length of the image pickup optical lens assembly, $f_1$ is the focal length of the first lens element, and $f_3$ is the focal length of the third lens element.

Another objective of the present invention is to provide an image pickup optical lens assembly, sequentially arranged from an object side to an image side along an optical axis, comprising: the first lens element with positive refractive power, having a convex object-side surface; the second lens element with negative refractive power, having a concave object-side surface and a convex image-side surface; the third lens element with refractive power, assigned with positive refractive power or negative refractive power, having a concave image-side surface; the fourth lens element with positive refractive power, made of a plastic material, and having a convex image-side surface, and both object-side surface and image-side surface being aspheric; and the fifth lens element with negative refractive power, being made of a plastic material, and having a concave image-side surface, and both object-side surface and image-side surface being aspheric, and the mage-side surface of the fifth lens element having at least one inflection point. The image pickup optical lens assembly satisfies the following relations:

$$-6.0<(R_3+R_4)/(R_3-R_4)<-1.0 \quad (1)$$

$$0.3<T_{34}/T_{45}<2.5 \quad (2)$$

$$|f_1/f_3|<0.75 \quad (5)$$

Wherein, $R_3$ is the curvature radius of the object-side surface of the second lens element, $R_4$ is the curvature radius of the image-side surface of the second lens element, $T_{34}$ is the axial distance from the image-side surface of the third lens element to the object-side surface of the fourth lens element, $T_{45}$ is the axial distance from the image-side surface of the image-side surface of the fourth lens element to the object-side surface of the fifth lens element, f is the focal length of the image pickup optical lens assembly, $f_1$ is the focal length of the first lens element, and $f_3$ is the focal length of the third lens element.

Another objective of the present invention is to provide an image pickup optical lens assembly, as in the aforesaid, and the image pickup optical lens assembly satisfies one or its combination of the following relations in addition to Relations (1), (2) and (5):

$$28<v_1-v_2<45 \quad (6)$$

$$\text{Preferably, } |f_1/f_3|<0.5 \quad (12)$$

$$(|R_5|+|R_6|)/f<2.0 \quad (14)$$

$$0.04<CT_4/f<0.20 \quad (10)$$

Wherein, $v_1$ is the Abbe number of the first lens element, $v_2$ is the Abbe number of the second lens element, $R_5$ is the curvature radius of the object-side surface of the third lens element, $R_6$ is the curvature radius of the image-side surface of the third lens element, $CT_4$ is the thickness of the fourth lens element along optical axis, f is the focal length of the image pickup optical lens assembly, $f_1$ is the focal length of the first lens element, and $f_3$ is the focal length of the third lens element.

With appropriate gaps among the first lens element, second lens element, third lens element, fourth lens element and fifth lens element along the optical axis of the present invention, a good aberration correction and a better modulation transfer function (MTF) in a greater field angle can be achieved, and the total length of the optical lens assembly can be shortened effectively for the application for the image pickup optical system of compact electronic devices.

In the image pickup optical lens assembly of the present invention, the first lens element with positive refractive power and the second lens element with negative refractive power, or the third lens element with positive or negative refractive power can provide the refractive power required for the combination of the first lens element, second lens element and third lens element and compensate aberrations, and then the fourth lens element with positive refractive power can provide a greater refractive power to enlarge the image, and the fifth lens element can correct the aberration and color difference of images of the fourth lens element and adjust the modulation transfer function (MTF) to enhance the resolution of the whole image pickup optical lens assembly, such that the aberration and distortion of the image pickup optical lens assembly can meet the high-resolution requirement.

In the image pickup optical lens assembly of the present invention, the combination of the first lens element with positive refractive power, the second lens element with negative refractive power, the third lens element with positive or negative refractive power, and the fourth lens element with positive refractive power and the fifth lens element with negative refractive power can provide compensations to reduce the total length of the image pickup optical lens assembly effectively, such that a greater effective photosensitive area of the image sensor can be obtained in the same total length. In other words, a shorter image pickup optical lens assembly can be designed with the same effective photosensitive area of the image sensor.

In the image pickup optical lens assembly of the present invention, the fourth lens element or the fifth lens element can be made of a plastic material to favor the manufacture and lower the cost.

BRIEF DESCRIPTION OF THE DRAWINGS

FIG. 11 shows Table 1 that lists optical data of the first preferred embodiment of the present invention;

FIG. 12 shows Table 2 that lists aspherical surface data of the first preferred embodiment of the present invention;

FIG. 13 shows Table 3 that lists optical data of the second preferred embodiment of the present invention;

FIG. 14 shows Table 4 that lists aspherical surface data of the second preferred embodiment of the present invention;

FIG. 15 shows Table 5 that lists optical data of the third preferred embodiment of the present invention;

FIG. 16 shows Table 6 that lists aspherical surface data of the third preferred embodiment of the present invention;

FIG. 17 shows Table 7 that lists optical data of the fourth preferred embodiment of the present invention;

FIG. 18 shows Table 8 that lists aspherical surface data of the fourth preferred embodiment of the present invention;

FIG. 19 shows Table 9 that lists optical data of the fifth preferred embodiment of the present invention;

FIG. 20 shows Table 10 that lists aspherical surface data of the fifth preferred embodiment of the present invention;

FIG. 21 shows Table 11 that lists optical data of the sixth preferred embodiment of the present invention;

FIG. 22 shows Table 12 that lists aspherical surface data of the sixth preferred embodiment of the present invention;

FIG. 23 shows Table 13 that lists optical data of the seventh preferred embodiment of the present invention;

FIG. 24 shows Table 14 that lists aspherical surface data of the seventh preferred embodiment of the present invention;

FIG. 25 shows Table 15 that lists optical data of the eighth preferred embodiment of the present invention; and FIG. 26 shows Table 16 that lists aspherical surface data of the eighth preferred embodiment of the present invention.

FIG. 27 shows Table 17 that lists optical data of the ninth preferred embodiment of the present invention; and FIG. 28 shows Table 18 that lists aspherical surface data of the ninth preferred embodiment of the present invention.

FIG. 29 shows Table 19 that lists optical data of the tenth preferred embodiment of the present invention;

FIG. 30 shows Table 20 that lists aspherical surface data of the tenth preferred embodiment of the present invention; and FIG. 31 shows Table 21 that lists data of related relations of the first to tenth preferred embodiments of the present invention.

DETAILED DESCRIPTION OF THE PREFERRED EMBODIMENTS

Figure 1A:
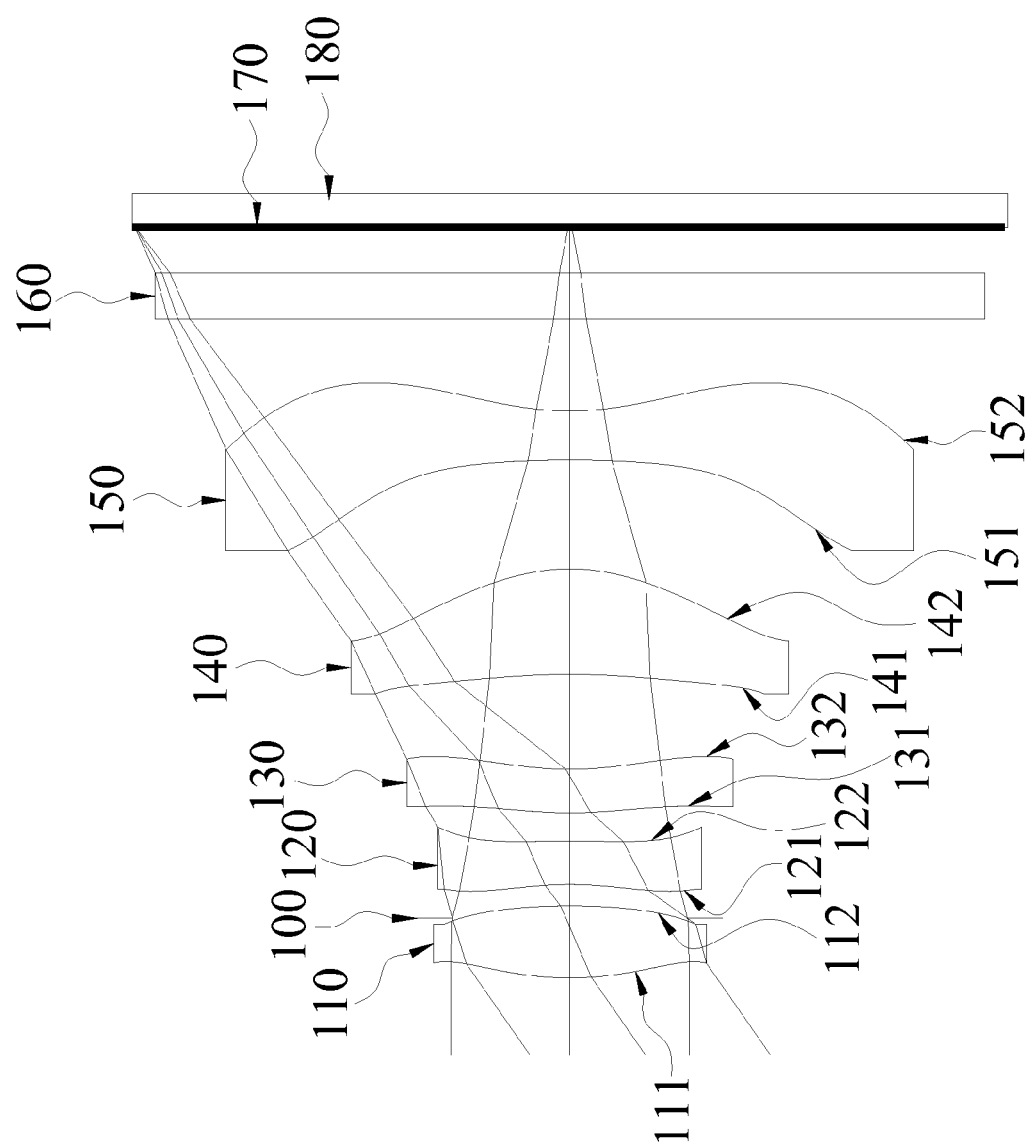
FIG. 1A is a schematic view of an optical system in accordance with the first preferred embodiment of the present invention.

With reference to FIG. 1A for an image pickup optical lens assembly of the present invention, the image pickup optical lens assembly, sequentially arranged from an object side to an image side along an optical axis, comprises the first lens element (110), the second lens element (120), the third lens element (130), the fourth lens element (140) and the fifth lens element (150), wherein the first lens element (110) with positive refractive power has a convex object-side surface (111) and a convex image-side surface (112) proximate to the optical axis, and both the object-side surface (111) and the image-side surface (112) can be aspheric or spheric; the second lens element (120) with negative refractive power has a concave object-side surface (121) and a convex image-side surface (122) proximate to the optical axis, and both object-side surface (121) and image-side surface (122) can be aspheric or spheric; the third lens element (130) with negative refractive power proximate to the optical axis has a convex object-side surface (131) and a concave image-side surface (132), and both object-side surface (131) and image-side surface (132) can be aspheric or spheric; the fourth lens element (140) with positive refractive power has a concave object-side surface (141) and a convex image-side surface (142) proximate to the optical axis, and both object-side surface (141) and image-side surface (142) can be aspheric or spheric; and the fifth lens element (150) with negative refractive power has a concave object-side surface (151) and a concave image-side surface (152) proximate to the optical axis, and both object-side surface (151) and image-side surface (152) are aspheric, and the image-side surface (152) of the fifth lens element has at least one inflection point. The image pickup optical lens assembly further comprises an aperture (100) and an infrared filter (160), wherein the aperture (100) is installed between the first lens element (110) and the second lens element (120), and the infrared filter (160) is installed between the fifth lens element (150) and the image plane (170), and generally made of a plate optical material without affecting the overall focal length of the image pickup optical lens assembly of the present invention. The image pickup optical lens assembly further comprises an image sensor (180) installed at the image plane (170) for imaging an object to be photographed. The first lens element (110), second lens element (120), third lens element (130), fourth lens element (140) and fifth lens element (150) come with aspheric optical surfaces in compliance with the aspherical surface formula as given in Equation (15):

$$X(Y) = \frac{(Y^2/R)}{1 + \sqrt{(1 - (1+K)(Y/R)^2)}} + \sum_i (A_i) \cdot (Y^i) \quad (15)$$

Wherein, X is the relative height between a point on the aspherical surface with a distance Y to the optical axis and a plane tangent to the tip of the aspherical surface along the optical axis;

Y is the distance between a point on the curve of the aspherical surface to the optical axis;

K is the conic coefficient; and $A_i$ is the $i^{th}$ level aspherical surface coefficient.

With the foregoing setup of the first lens element (110), second lens element (120), third lens element (130), fourth lens element (140), fifth lens element (150), aperture (100) and image sensor (180), the image pickup optical lens assembly of the present invention satisfies Relations (1), (2) and (3).

If the ratio of the curvature radius $R_3$ of the object-side surface of the second lens element (121) to the curvature radius $R_4$ of the image-side surface of second lens element (122) by the condition (as shown in Relation (1)), then the exit angle of the second lens element (120) will be decreased to reduce the aberration of the second lens element (120). If the ratio of the distance $T_{34}$ from the image-side surface of the third lens element (132) to the object-side surface of the fourth lens element (141) to the distance $T_{45}$ from the image-side surface of the fourth lens element (142) to the object-side surface of the fifth lens element (151) by the condition (as shown in Relation (2)), then the refractive angle of the light passing through the second lens element (120) and air gap to enter into third lens element (130) will fall within a specific range to increase the refractive angle and decrease the total length. If the difference between the refractive index $N_1$ of the first lens element (110) and the refractive index $N_2$ of the second lens element (120) is limited to the condition (as shown in Relation (3)), then the refractive angles of the lights with different wavelengths passing through the first lens element (110) and the second lens element (120) will differ to reduce coma aberrations of the optical system. If the difference between the Abbe number $v_1$ of the first lens element (110) and the Abbe number $v_2$ of the second lens element (120) is limited by the condition (as shown in Relation (6)), the color difference of the first lens element (110) and the second lens element (120) will be reduce to enhance the aberration compensation capability of the second lens element (120). If Relation (9) is satisfied, and the sum of the curvature radius $R_5$ of the object-side surface of the third lens element (131) and the curvature radius $R_6$ of the image-side surface of the third lens element (132) per unit length of the focal length f of the image pickup optical lens assembly is limited, then the spherical aberration of the third lens element (130) can be reduced further.

If Relation (4) is satisfied, the total length (TTL) of the image pickup optical lens assembly can be shortened effectively, such that a greater effective photosensitive area (ImgH) of the image sensor can be obtained in the same total length (TTL). If Relation (10) is satisfied, the thickness $CT_4$ of the fourth lens element (140) per unit length of the focal length f of the image pickup optical lens assembly can be reduced, such that the total length of the image pickup optical lens assembly can be shortened, and an appropriate thickness of the fourth lens element (140) can be maintained, so as to lower the level of difficulty of the manufacture.

If Relations (5), (8) or (11) is satisfied, the overall focal length f, the focal length $f_1$ of the first lens element (110), the focal length $f_2$ of the second lens element (120), the focal length $f_3$ of the third lens element (130), the focal length $f_4$ of the fourth lens element (140) and the focal length $f_5$ of the fifth lens element (150) can be adjusted to a balanced condition capable of allocating the required refractive power of the first lens element (110), second lens element (120), third lens element (130), fourth lens element (140) and fifth lens element (150) of the imagery optical system and improve the sensitivity of the imagery optical system.

Figure 2A:
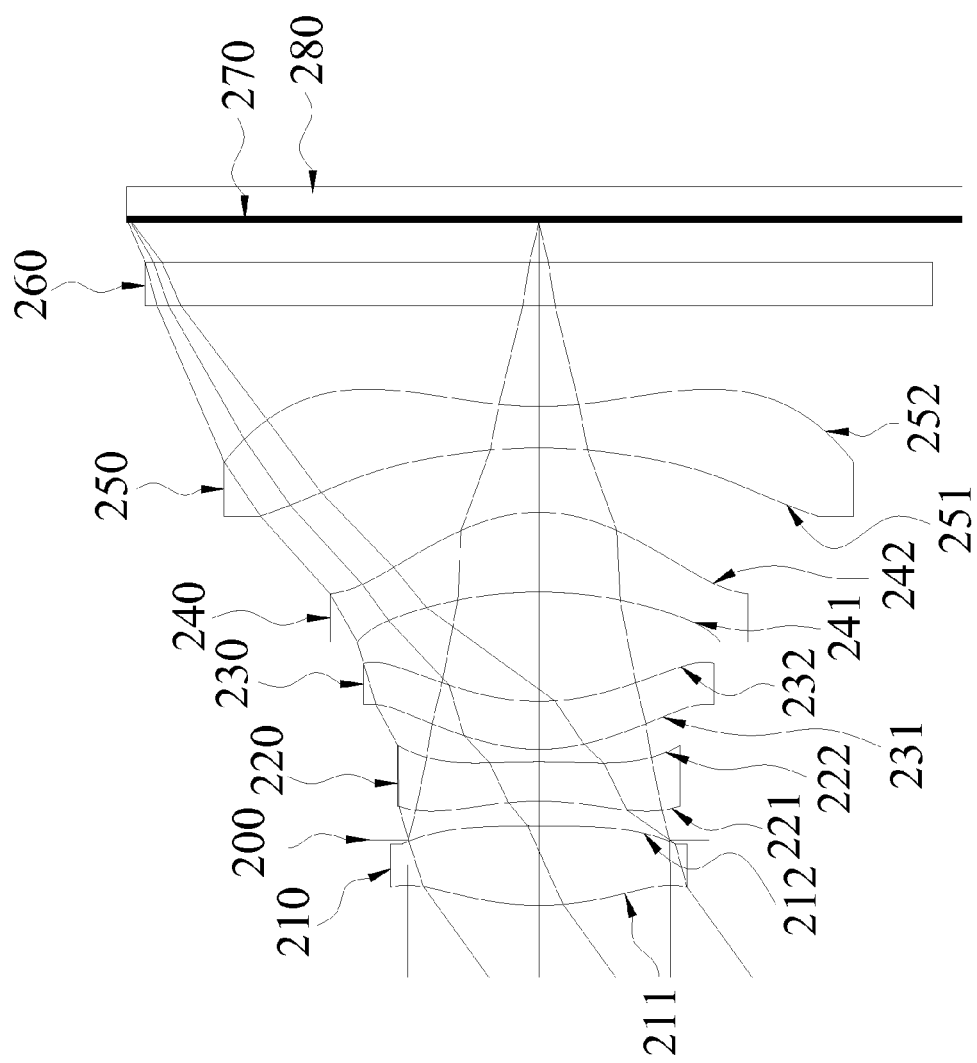
FIG. 2A is a schematic view of an optical system in accordance with the second preferred embodiment of the present invention.

With reference to FIG. 2A for an image pickup optical lens assembly of the present invention, the image pickup optical lens assembly, sequentially arranged from an object side to an image side along an optical axis, comprises the first lens element (210), the second lens element (220), the third lens element (230), the fourth lens element (240) and the fifth lens element (250), wherein the first lens element (210) with positive refractive power has a convex object-side surface (211) and a convex image-side surface (212) proximate to the optical axis, and both object-side surface (211) and image-side surface (212) can be aspheric or spheric; the second lens element (220) with negative refractive power has a concave object-side surface (221) and a convex image-side surface (222) proximate to the optical axis, and both object-side surface (221) and image-side surface (222) can be aspheric or spheric; the third lens element (230) with positive refractive power has a convex object-side surface (231) and a concave image-side surface (232) proximate to the optical axis, and both object-side surface (231) and third lens element image-side surface (232) can be aspheric or spheric; the fourth lens element (240) with positive refractive power has a concave object-side surface (241) and a convex image-side surface (242) proximate to the optical axis, and both object-side surface (241) and image-side surface (242) can be aspheric or spheric; and the fifth lens element (250) with negative refractive power has a concave object-side surface (251) and a concave image-side surface (252) proximate to the optical axis, and both object-side surface (251) and image-side surface (252) are aspheric, and the image-side surface of the fifth lens element (252) has at least one inflection point. The image pickup optical lens assembly further comprises an aperture (200) and an infrared filter (260), and the aperture (200) is installed between the first lens element (210) and the second lens element (220), and the infrared filter (260) is installed between the fifth lens element (250) and the image plane (270) and generally made of a plate optical material without affecting the focal length of the image pickup optical lens assembly of the present invention. The image pickup optical lens assembly further comprises an image sensor (280) installed at the image plane (270) for imaging an object to be photographed. The first lens element (210), second lens element (220), third lens element (230), fourth lens element (240) and fifth lens element (250) come with aspheric optical surfaces in compliance with the aspheric surface formula as given in Equation (15).

With the foregoing setup of the first lens element (210), second lens element (220), third lens element (230), fourth lens element (240), fifth lens element (250), aperture (200) and image sensor (280), the image pickup optical lens assembly of the present invention satisfies one or more of the following relations (1) to (14).

The image pickup optical lens assembly in accordance with the present invention is described in details by reference to the following preferred embodiments and related drawings.

First Preferred Embodiment

Figure 1B:
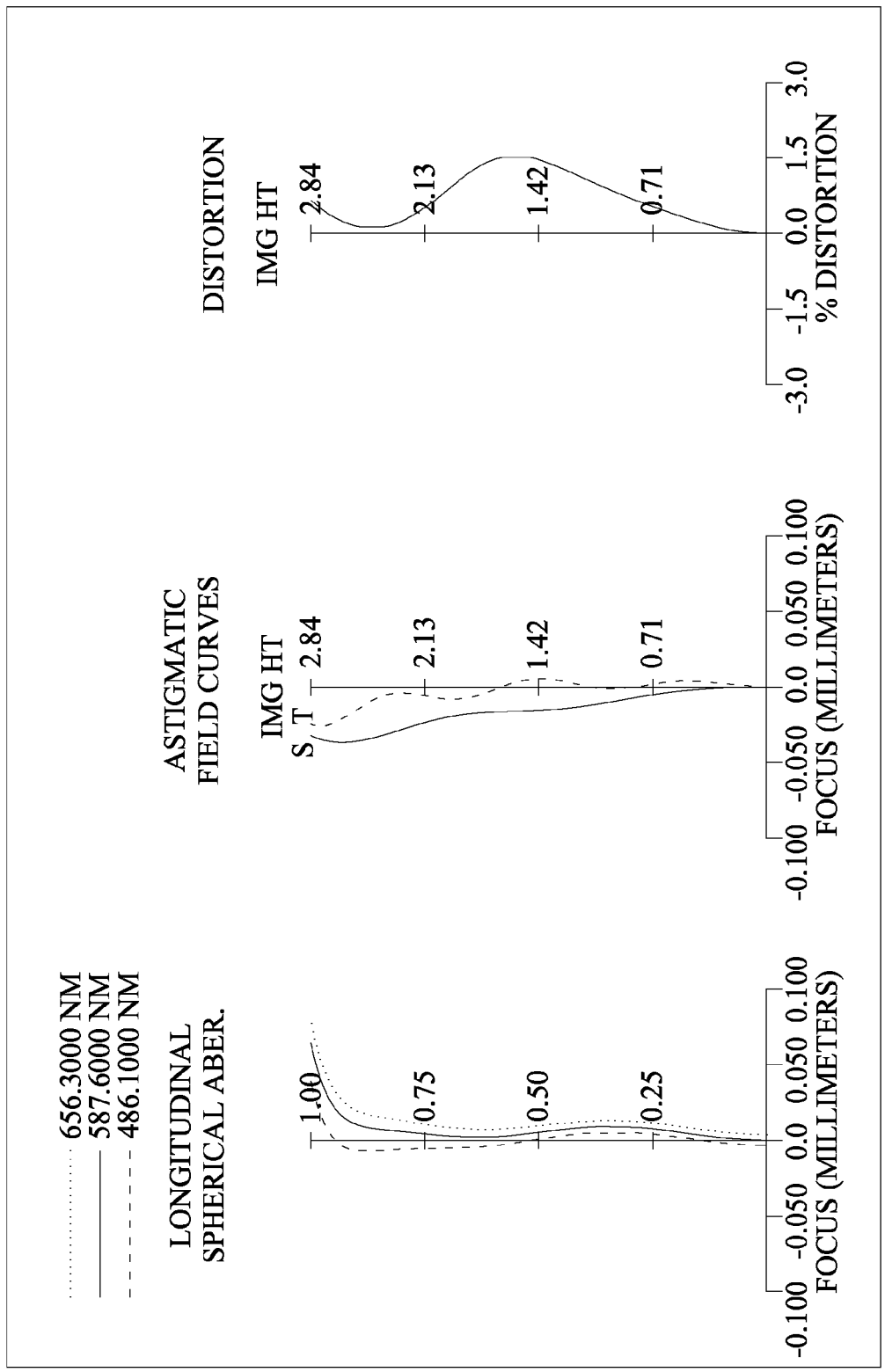
FIG. 1B is a series of aberration curves of the first preferred embodiment of the present invention.

With reference to FIGS. 1A and 1B for a schematic view and a series of aberration curves of an image pickup optical lens assembly in accordance with the first preferred embodiment of the present invention respectively, the image pickup optical lens assembly of the first preferred embodiment comprises five lens elements, an infrared filter (160), an aperture (100) and an image sensor (180). The image pickup optical lens assembly, sequentially arranged from an object side to an image side along an optical axis, comprises: the first lens element (110) with positive refractive power, which is a bi-convex plastic lens, and both of its object-side surface (111) and image-side surface (112) are aspheric; the second lens element (120) with negative refractive power, which is a plastic lens provided with a concave object-side surface (121) and a convex image-side surface (122) proximate to the optical axis, and both of its object-side surface (121) and image-side surface (122) are aspheric; the third lens element (130) with negative refractive power, which is a plastic lens, provided with a convex object-side surface (131) and a concave image-side surface (132) proximate to the optical axis, and both of its object-side surface (131) and image-side surface (132) are aspheric; the fourth lens element (140) with positive refractive power, which is a plastic lens, provided with a concave object-side surface (141) and a convex image-side surface (142), and both of its object-side surface (141) and image-side surface (142) are aspheric; the fifth lens element (150) with negative refractive power, which is a plastic lens, provided with a concave object-side surface (151) and a concave image-side surface (152) proximate to the optical axis, and both of its object-side surface (151) and image-side surface (152) are aspheric, and the image-side surface (152) of the fifth lens element has at least one inflection point; an infrared filter (IR-filter) (160) made of a glass material, which is a plate glass material and will not affect the focal length of the image pickup optical lens assembly of the present invention; and an image sensor (180) installed at an image plane (170). In this preferred embodiment, image pickup optical lens assembly further comprises an aperture (100) installed between the first lens element (110) and the second lens element (120).

With reference to FIG. 11 (or Table 1) for the optical data of this preferred embodiment, the object-side surface of the first lens element (111), the image-side surface of the first lens element (112), the object-side surface of the second lens element (121), the image-side surface of the second lens element (122), the object-side surface of the third lens element (131), the image-side surface of the third lens element (132), the object-side surface of the fourth lens element (141), the image-side surface of the fourth lens element (142), the object-side surface of the fifth lens element (151) and the image-side surface of the fifth lens element (152) are aspheric surfaces in compliance with the aspheric surface formula as given in Equation (15), and their aspheric coefficients are listed in FIG. 12 (or Table 2).

In the image pickup optical lens assembly in accordance with this preferred embodiment, the focal length of the whole image pickup optical system is f=4.05 (mm), the aperture value (f-number) is Fno=2.60, and half of the maximum view angle is HFOV=34.8 (degrees).

With reference to Table 1 for related data of this preferred embodiment, $R_3$ is the curvature radius of the object-side surface of the second lens element (121), $R_4$ is the curvature radius of the image-side surface of the second lens element (122), $T_{34}$ is the distance from the image-side surface of the third lens element (132) to the object-side surface of the fourth lens element (141) along the optical axis, $T_{45}$ is the distance from the image-side surface of the fourth lens element (142) to the object-side surface of the fifth lens element (151), $N_1$ is the refractive index of the first lens element (110), $N_2$ is the refractive index of the second lens element (120), and the conditions (as given in Relations (1), (2) and (3)) of $(R_3+R_4)/(R_3-R_4)$=−1.62, $T_{34}/T_{45}$=0.87, and $N_1-N_2$=−0.090 are satisfied.

In this preferred embodiment, the image pickup optical lens assembly further comprises an aperture (100) installed between the first lens element (110) and the second lens element (120), wherein if TTL is the distance from the object-side surface of the first lens element (111) to the image plane (170) along the optical axis, and an image sensor installed at the image plane, wherein ImgH is half of the diagonal length of an effective photosensitive area of the image sensor (180), then the relation (4)) of TTL/ImgH=1.69 is satisfied. If $CT_4$ is the thickness of the fourth lens element (140) of the image pickup optical lens assembly along the optical axis, and f is the focal length of the image pickup optical lens assembly, then the relation (10) of $CT_4$/f=0.17.

If $v_1$ is the Abbe number (or Abbe number) of the first lens element, and $v_2$ is the Abbe number of the second lens element, then the relation (6) of $v_1-v_2$=32.1 is satisfied. If f is the focal length of the image pickup optical lens assembly, $R_5$ is the curvature radius of the object-side surface of the third lens element (131), $R_6$ is the curvature radius of the image-side surface of the third lens element (132), and the relation (9) of $(|R_5|+|R_6|)/f$=1.22 is satisfied.

If f is the focal length of the whole image pickup optical lens assembly, $f_1$ is the focal length of the first lens element (110), $f_3$ is the focal length of the third lens element (130), $f_4$ is the focal length of the fourth lens element (140), $f_5$ is the focal length of the fifth lens element (150), then the relations (5), (8) and (11) of $|f_1/f_3|$=0.10; $f/f_4$=1.34; and $|f/f_4|+|f/f_5|$=2.83 are satisfied respectively, and data of each related relation are listed in FIG. 31 (or Table 21).

From the optical data listed in FIG. 11 (which is Table 1) and the aberration curve as shown in FIG. 1B, good compensation effects of the longitudinal spherical aberration, astigmatic field curving and distortion can be achieved by the image pickup optical lens assembly in accordance with this preferred embodiment of the present invention.

Second Preferred Embodiment

Figure 2B:
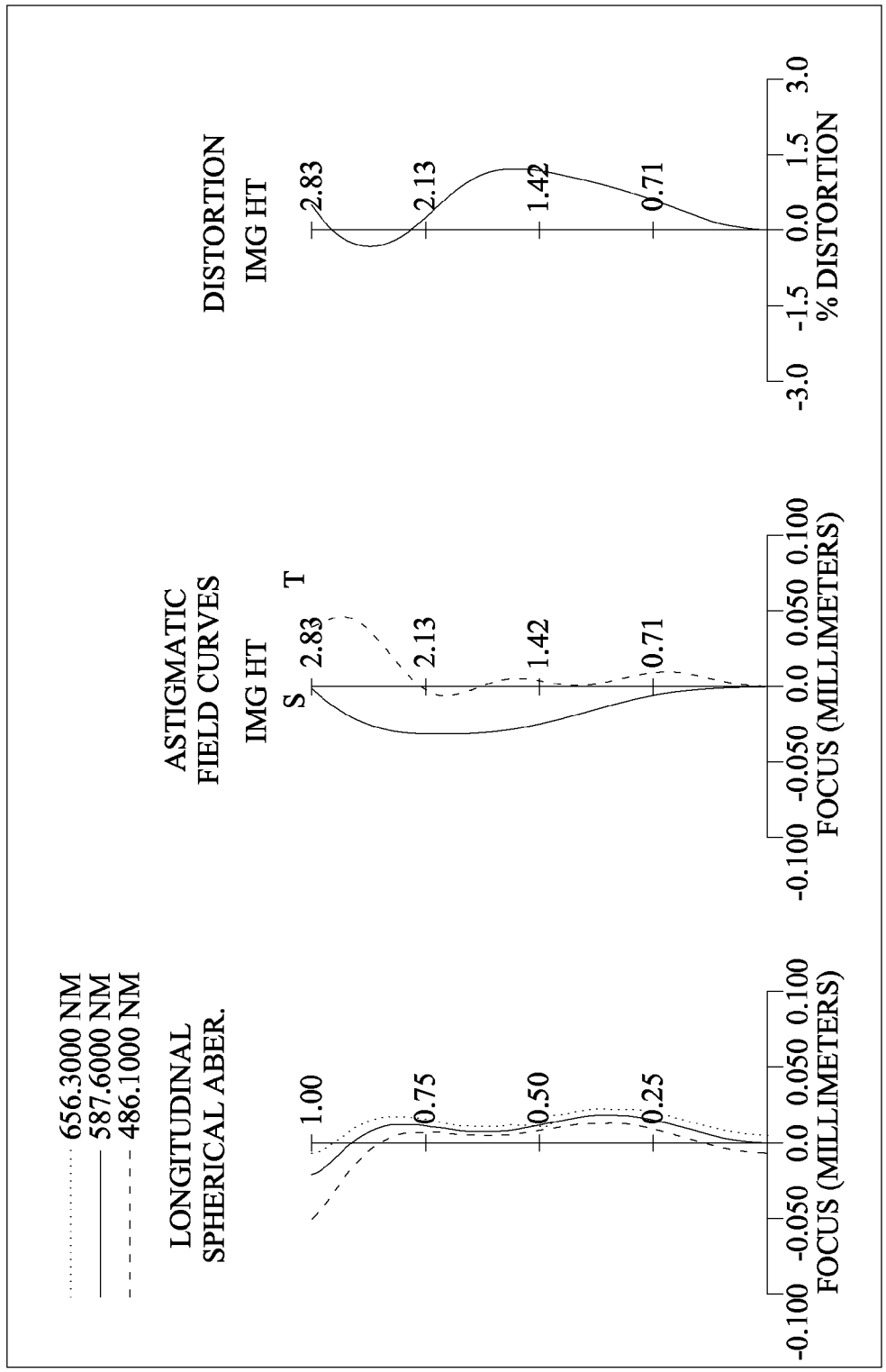
FIG. 2B is a series of aberration curves of the second preferred embodiment of the present invention.

With reference to FIGS. 2A and 2B for a schematic view and a series of aberration curves of an image pickup optical lens assembly in accordance with the second preferred embodiment of the present invention respectively, the image pickup optical lens assembly of this preferred embodiment comprises five lens elements, an infrared filter (260), an aperture (200) and an image sensor (280). The image pickup optical lens assembly, sequentially arranged from an object side to an image side along an optical axis, comprises: the first lens element (210) with positive refractive power, which is a bi-convex plastic lens, and both of its object-side surface (211) and image-side surface (212) are aspheric; the second lens element (220) with negative refractive power, which is a plastic lens provided with a concave object-side surface (221) and a convex image-side surface (222) proximate to the optical axis, and both of its object-side surface (221) and image-side surface (222) are aspheric; the third lens element (230) with negative refractive power, which is a plastic lens, provided with a convex object-side surface (231) and a concave image-side surface (232) proximate to the optical axis, and both of its object-side surface (231) and image-side surface (232) are aspheric; the fourth lens element (240) with positive refractive power, which is a plastic lens, provided with a concave object-side surface (241) and a convex image-side surface (242), and both of its object-side surface (241) and image-side surface (242) are aspheric; the fifth lens element (250) with negative refractive power, which is a plastic lens, provided with a concave object-side surface (251) and a concave image-side surface (252) proximate to the optical axis, and both of its object-side surface (251) and image-side surface (252) are aspheric, and the image-side surface of the fifth lens element (252) has at least one inflection point; an infrared filter (IR-filter) (260) made of a glass material, which is a plate glass material and will not affect the focal length of the image pickup optical lens assembly of the present invention; and an image sensor (280) installed at an image plane (270). In this preferred embodiment, image pickup optical lens assembly further comprises an aperture (200) installed between the first lens element (210) and the second lens element (220).

With reference to FIG. 13 (or Table 3) for the optical data of this preferred embodiment, the object-side surface of the first lens element (211), the image-side surface of the first lens element (212), the object-side surface of the second lens element (221), the image-side surface of the second lens element (222), the object-side surface of the third lens element (231), the image-side surface of the third lens element (232), the object-side surface of the fourth lens element (241), the image-side surface of the fourth lens element (242), the object-side surface of the fifth lens element (251), and the image-side surface of the fifth lens element (252) are aspheric surfaces in compliance with the aspheric surface formula as given in Equation (15), and their aspheric coefficients are listed in FIG. 14 (or Table 4).

In the image pickup optical lens assembly in accordance with this preferred embodiment, the focal length of the whole image pickup optical system is f=3.90 (mm), the aperture value (f-number) is Fno=2.15, and half of the maximum view angle is HFOV=35.8 (degrees).

With reference to Table 3 for related data of this preferred embodiment, $R_3$ is the curvature radius of the object-side surface of the second lens element (221), $R_4$ is the curvature radius of the image-side surface of the second lens element (222), $T_{34}$ is the distance from the image-side surface of the third lens element (232) to the object-side surface of the fourth lens element (241) along the optical axis, $T_{45}$ is the distance from the image-side surface of the fourth lens element (242) to the object-side surface of the fifth lens element (251), $N_1$ is the refractive index of the first lens element (210), $N_2$ is the refractive index of the second lens element (220), and the conditions (as given in Relations (1), (2) and (3)) of $(R_3+R_4)/(R_3-R_4)=-2.01$, $T_{34}/T_{45}=1.7$, and $N_1-N_2=-0.090$ are satisfied.

In this preferred embodiment, the image pickup optical lens assembly further comprises an aperture (200) installed between the first lens element (210) and the second lens element (220), wherein if TTL is the distance from the object-side surface of the first lens element (211) to the image plane (270) along the optical axis, and an image sensor installed at the image plane, wherein ImgH is half of the diagonal length of an effective photosensitive area of the image sensor (280), then the relation (4)) of TTL/ImgH=1.64 is satisfied. If $CT_4$ is the thickness of the fourth lens element (140) of the image pickup optical lens assembly along the optical axis, and f is the focal length of the image pickup optical lens assembly, then the relation (10) of $CT_4/f=0.14$.

If $v_1$ is the Abbe number (or Abbe number) of the first lens element (210), and $v_2$ is the Abbe number of the second lens element (220), then the relation (6) of $v_1-v_2=32.1$ is satisfied. If f is the focal length of the image pickup optical lens assembly, $R_5$ is the curvature radius of the object-side surface of the third lens element (231), $R_6$ is the curvature radius of the image-side surface of the third lens element (232), and the relation (9) of $(|R_5|+|R_6|)/f=0.73$ is satisfied.

If f is the focal length of the whole image pickup optical lens assembly, $f_1$ is the focal length of the first lens element (210), $f_3$ is the focal length of the third lens element (230), $f_4$ is the focal length of the fourth lens element (240), $f_5$ is the focal length of the fifth lens element (250), then the relations (5), (8) and (11) of $|f_1/f_3|=0.39$; $f/f4=1.39$; and $|f/f_4|+|f/f_5|=2.88$ are satisfied respectively, and data of each related relation are listed in FIG. 31 (or Table 21).

From the optical data listed in FIG. 13 (which is Table 3) and the aberration curve as shown in FIG. 2B, good compensation effects of the longitudinal spherical aberration, astigmatic field curving and distortion can be achieved by the image pickup optical lens assembly in accordance with this preferred embodiment of the present invention.

Third Preferred Embodiment

Figure 3A:
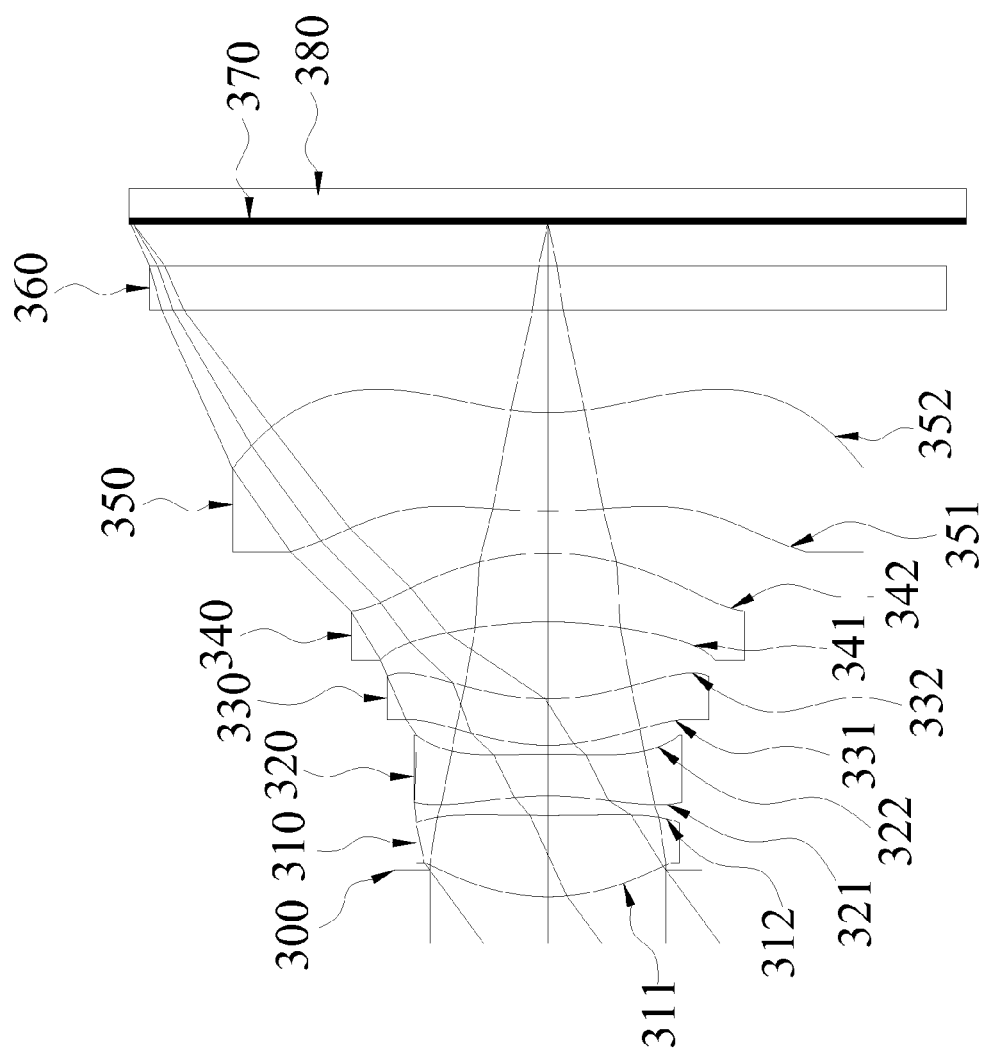
FIG. 3A is a schematic view of an optical system in accordance with the third preferred embodiment of the present invention.
Figure 3B:
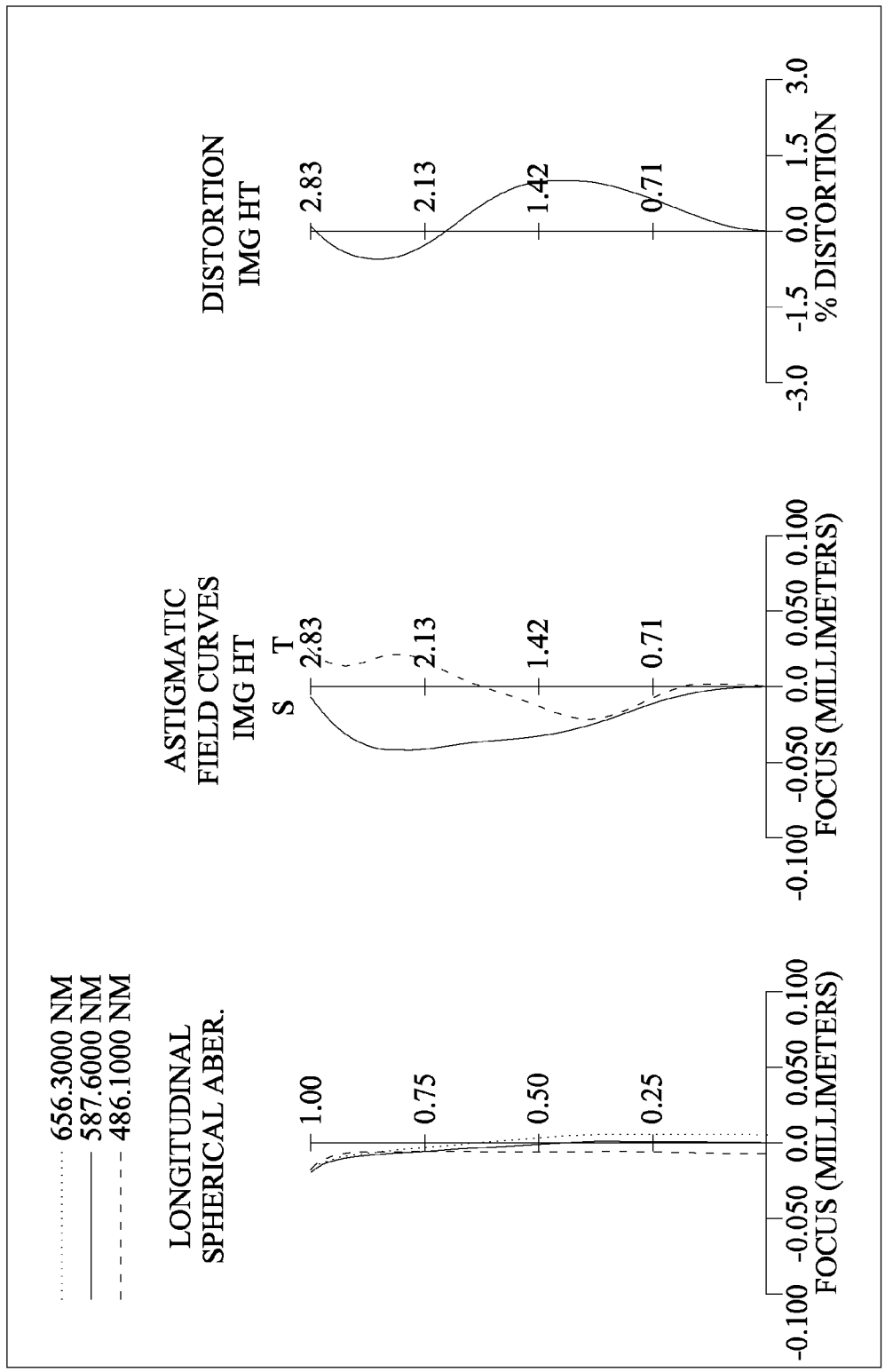
FIG. 3B is a series of aberration curves of the third preferred embodiment of the present invention.

With reference to FIGS. 3A and 3B for a schematic view and a series of aberration curves of an image pickup optical lens assembly in accordance with the third preferred embodiment of the present invention respectively, the image pickup optical lens assembly of this preferred embodiment comprises five lens elements, an infrared filter (360), an aperture (300) and an image sensor (380). The image pickup optical lens assembly, sequentially arranged from an object side to an image side along an optical axis, comprises: the first lens element (310) with positive refractive power, which is a plastic lens provided with a convex object-side surface (311) and a concave image-side surface (312) proximate to the optical axis, and both of its object-side surface (311) and image-side surface (312) are aspheric; the second lens element (320) with negative refractive power, which is a plastic lens provided with a concave object-side surface (321) and a convex image-side surface (322) proximate to the optical axis, and both of its object-side surface (321) and image-side surface (322) are aspheric; the third lens element (330) with negative refractive power, which is a plastic lens, provided with a convex object-side surface (331) and a concave image-side surface (332) proximate to the optical axis, and both of its object-side surface (331) and image-side surface (332) are aspheric; the fourth lens element (340) with positive refractive power, which is a plastic lens, provided with a concave object-side surface (341) and a convex image-side surface (342), and both of its object-side surface (341) and image-side surface (342) are aspheric; the fifth lens element (350) with negative refractive power, which is a plastic lens, provided with a convex object-side surface (351) and a concave image-side surface (352) proximate to the optical axis, and both of its object-side surface (351) and image-side surface (352) are aspheric, and the image-side surface (352) of the fifth lens element has at least one inflection point; an infrared filter (IR-filter) (360) made of a glass material, which is a plate glass material and will not affect the focal length of the image pickup optical lens assembly of the present invention; and an image sensor (380) installed at an image plane (370). In this preferred embodiment, image pickup optical lens assembly further comprises an aperture (300) installed between the first lens element (310) and an object to be photographed.

With reference to FIG. 15 (or Table 5) for the optical data of this preferred embodiment, the object-side surface of the first lens element (311), the image-side surface of the first lens element (312), the object-side surface of the second lens element (321), the image-side surface of the second lens element (322), the object-side surface of the third lens element (331), the image-side surface of the third lens element (332), the object-side surface of the fourth lens element (341), the image-side surface of the fourth lens element (342), the object-side surface of the fifth lens element (351) and the image-side surface of the fifth lens element (352) are aspheric surfaces in compliance with the aspheric surface formula as given in Equation (15), and their aspheric coefficients are listed in FIG. 16 (or Table 6).

In the image pickup optical lens assembly in accordance with this preferred embodiment, the focal length of the whole image pickup optical system is f=3.86 (mm), the aperture value (f-number) is Fno=2.40, and half of the maximum view angle is HFOV=36.3 (degrees).

With reference to Table 5 for related data of this preferred embodiment, $R_3$ is the curvature radius of the object-side surface of the second lens element (321), $R_4$ is the curvature radius of the image-side surface of the second lens element (322), $T_{34}$ is the distance from the image-side surface of the third lens element (332) to the object-side surface of the fourth lens element (341) along the optical axis, $T_{45}$ is the distance from the image-side surface of the fourth lens element (342) to the object-side surface of the fifth lens element (351), $N_1$ is the refractive index of the first lens element (310), $N_2$ is the refractive index of the second lens element (320), and the conditions (as given in Relations (1), (2) and (3)) of $(R_3+R_4)/(R_3-R_4)=-1.79$, $T_{34}/T_{45}=1.85$, and $N_1-N_2=-0.090$ are satisfied.

In this preferred embodiment, the image pickup optical lens assembly further comprises an aperture (300) installed between the first lens element (310) and an object to be photographed, wherein if TTL is the distance from the object-side surface of the first lens element (311) to the image plane (370) along the optical axis, and an image sensor installed at the image plane, wherein ImgH is half of the diagonal length of an effective photosensitive area of the image sensor (380), then the relation (4)) of TTL/ImgH=1.59 is satisfied. If $CT_4$ is the thickness of the fourth lens element (140) of the image pickup optical lens assembly along the optical axis, and f is the focal length of the image pickup optical lens assembly, then the relation (10) of $CT_4/f$=0.12.

If $v_1$ is the Abbe number (or Abbe number) of the first lens element (310), and $v_2$ is the Abbe number of the second lens element (320), then the relation (6) of $v_1-v_2$=32.1 is satisfied. If f is the focal length of the image pickup optical lens assembly, $R_5$ is the curvature radius of the object-side surface of the third lens element (331), $R_6$ is the curvature radius of the image-side surface of the third lens element (332), and the relation (9) of $(|R_5|+|R_6|)/f$=0.78 is satisfied.

If f is the focal length of the whole image pickup optical lens assembly, $f_1$ is the focal length of the first lens element (310), $f_3$ is the focal length of the third lens element (330), $f_4$ is the focal length of the fourth lens element (340), $f_5$ is the focal length of the fifth lens element (350), then the relations (5), (8) and (11) of $|f_1/f_3|$=0.27; $f/f4$=0.55; and $|f/f_4|+|f/f_5|$=1.15 are satisfied respectively, and data of each related relation are listed in FIG. 31 (or Table 21).

From the optical data listed in FIG. 15 (which is Table 5) and the aberration curve as shown in FIG. 3B, good compensation effects of the longitudinal spherical aberration, astigmatic field curving and distortion can be achieved by the image pickup optical lens assembly in accordance with this preferred embodiment of the present invention.

Fourth Preferred Embodiment

Figure 4A:
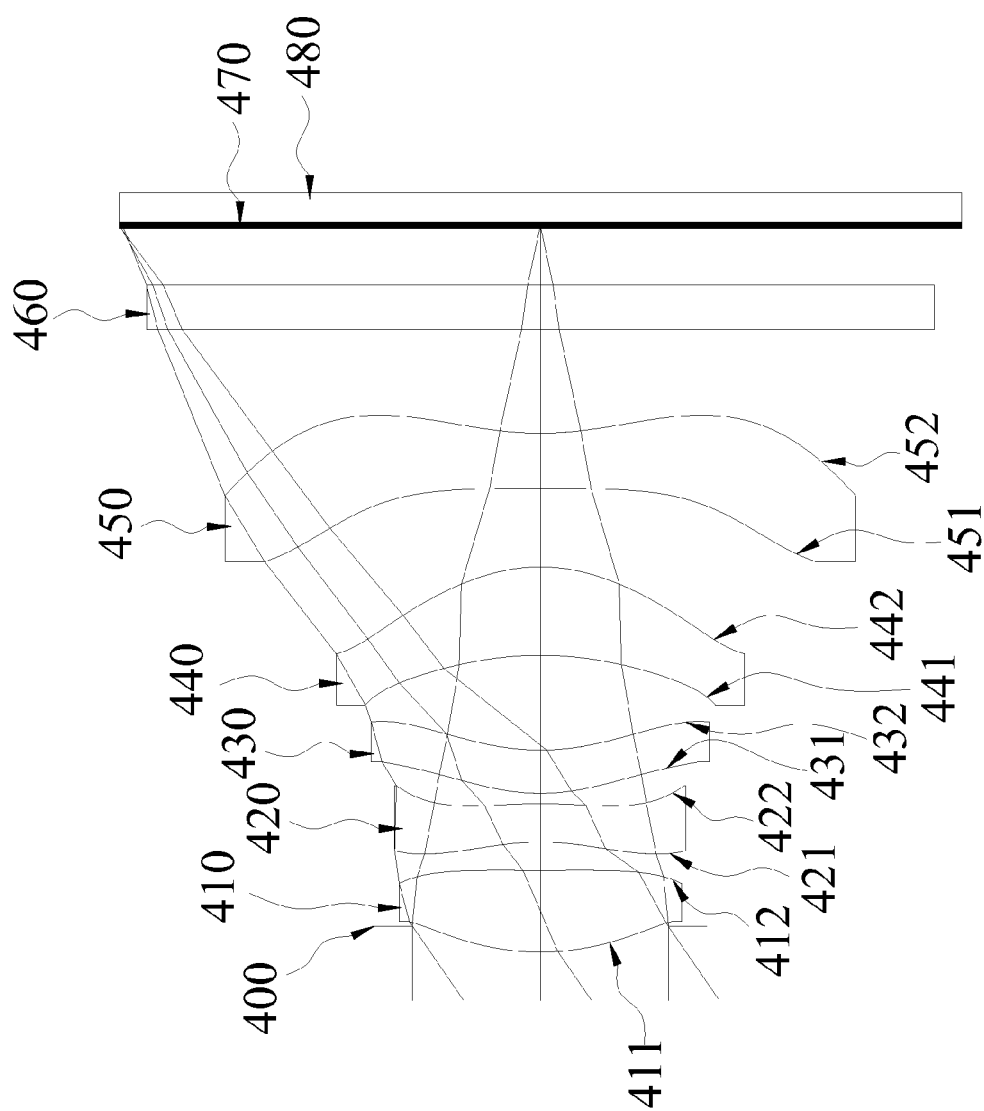
FIG. 4A is a schematic view of an optical system in accordance with the fourth preferred embodiment of the present invention.
Figure 4B:
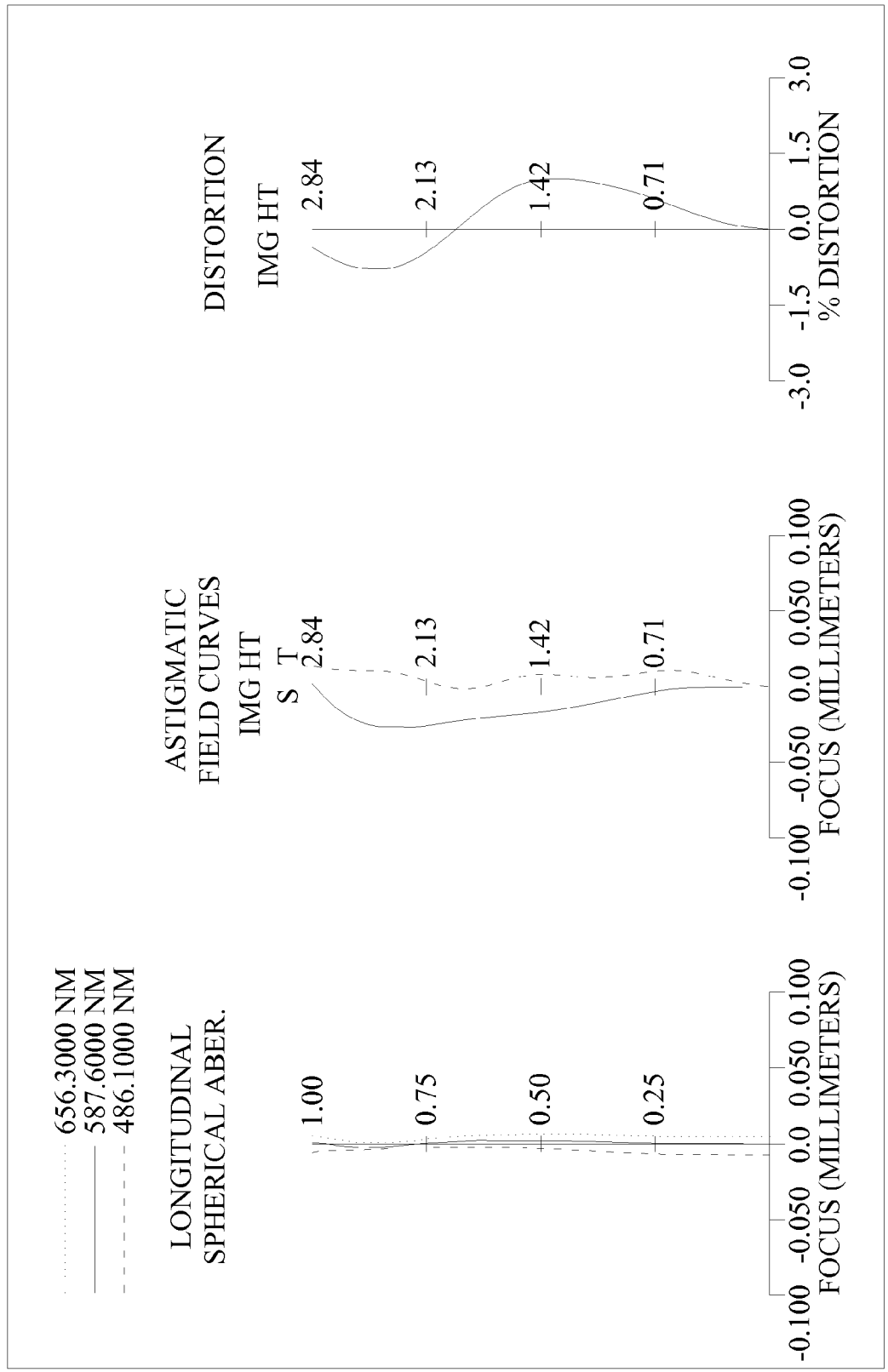
FIG. 4B is a series of aberration curves of the fourth preferred embodiment of the present invention.

With reference to FIGS. 4A and 4B for a schematic view and a series of aberration curves of an image pickup optical lens assembly in accordance with the fourth preferred embodiment of the present invention respectively, the image pickup optical lens assembly of this preferred embodiment comprises five lens elements, an infrared filter (460), an aperture (400) and an image sensor (480). The image pickup optical lens assembly, sequentially arranged from an object side to an image side along an optical axis, comprises: the first lens element (410) with positive refractive power, which is a plastic lens provided with a convex object-side surface (411) and a concave image-side surface (412) proximate to the optical axis, and both of its object-side surface (411) and image-side surface (412) are aspheric; the second lens element (420) with negative refractive power, which is a plastic lens provided with a concave object-side surface (421) and a convex image-side surface (422) proximate to the optical axis, and both of its object-side surface (421) and image-side surface (422) are aspheric; the third lens element (430) with negative refractive power, which is a plastic lens, provided with a convex object-side surface (431) and a concave image-side surface (432) proximate to the optical axis, and both of its object-side surface (431) and image-side surface (432) are aspheric; the fourth lens element (440) with positive refractive power, which is a plastic lens, provided with a concave object-side surface (441) and a convex image-side surface (442), and both of its object-side surface (441) and image-side surface (442) are aspheric; the fifth lens element (450) with negative refractive power, which is a plastic lens, provided with a concave object-side surface (451) and a concave image-side surface (452) proximate to the optical axis, and both of its object-side surface (451) and image-side surface (452) are aspheric, and the image-side surface (452) of the fifth lens element has at least one inflection point; an infrared filter (IR-filter) (460) made of a glass material, which is a plate glass material and will not affect the focal length of the image pickup optical lens assembly of the present invention; and an image sensor (480) installed at an image plane (470). In this preferred embodiment, image pickup optical lens assembly further comprises an aperture (400) installed between the first lens element (410) and an object to be photographed.

With reference to FIG. 17 (or Table 7) for the optical data of this preferred embodiment, the object-side surface of the first lens element (411), the image-side surface of the first lens element (412), the object-side surface of the second lens element (421), the image-side surface of the second lens element (422), the object-side surface of the third lens element (431), the image-side surface of the third lens element (432), the object-side surface of the fourth lens element (441), the image-side surface of the fourth lens element (442), the object-side surface of the fifth lens element (451) and the image-side surface of the fifth lens element (452) are aspheric surfaces in compliance with the aspheric surface formula as given in Equation (15), and their aspheric coefficients are listed in FIG. 18 (or Table 8).

In the image pickup optical lens assembly in accordance with this preferred embodiment, the focal length of the whole image pickup optical system is f=4.14 (mm), the aperture value (f-number) is Fno=2.40, and half of the maximum view angle is HFOV=34.5 (degrees).

With reference to Table 7 for related data of this preferred embodiment, $R_3$ is the curvature radius of the object-side surface of the second lens element (421), $R_4$ is the curvature radius of the image-side surface of the second lens element (422), $T_{34}$ is the distance from the image-side surface of the third lens element (432) to the object-side surface of the fourth lens element (441) along the optical axis, $T_{45}$ is the distance from the image-side surface of the fourth lens element (442) to the object-side surface of the fifth lens element (451), $N_1$ is the refractive index of the first lens element (410), $N_2$ is the refractive index of the second lens element (420), and the conditions (as given in Relations (1), (2) and (3)) of $(R_3+R_4)/(R_3-R_4)$=-2.54, $T_{34}/T_{45}$=1.20, and $N_1-N_2$=-0.088 are satisfied.

In this preferred embodiment, the image pickup optical lens assembly further comprises an aperture (400) installed between the first lens element (410) and an object to be photographed, wherein if TTL is the distance from the object-side surface of the first lens element (411) to the image plane (470) along the optical axis, and an image sensor installed at the image plane, wherein ImgH is half of the diagonal length of an effective photosensitive area of the image sensor (480), then the relation (4)) of TTL/ImgH=1.69 is satisfied. If $CT_4$ is the thickness of the fourth lens element (140) of the image pickup optical lens assembly along the optical axis, and f is the focal length of the image pickup optical lens assembly, then the relation (10) of $CT_4/f$=0.14.

If $v_1$ is the Abbe number (or Abbe number) of the first lens element (410), and $v_2$ is the Abbe number of the second lens element (420), then the relation (6) of $v_1-v_2$=32.5 is satisfied. If f is the focal length of the image pickup optical lens assembly, $R_5$ is the curvature radius of the object-side surface of the third lens element (431), $R_6$ is the curvature radius of the image-side surface of the third lens element (432), and the relation (9) of $(|R_5|+|R_6|)/f$=0.70 is satisfied.

If f is the focal length of the whole image pickup optical lens assembly, $f_1$ is the focal length of the first lens element (410), $f_3$ is the focal length of the third lens element (430), $f_4$ is the focal length of the fourth lens element (440), $f_5$ is the focal length of the fifth lens element (450), then the relations (5), (8) and (11) of $|f_1/f_3|$=0.28; $f/f4$=1.13; and $|f/f_4|+|f/f_5|$=2.32 are satisfied respectively, and data of each related relation are listed in FIG. 31 (or Table 21).

From the optical data listed in FIG. 17 (which is Table 7) and the aberration curve as shown in FIG. 4B, good compensation effects of the longitudinal spherical aberration, astigmatic field curving and distortion can be achieved by the image pickup optical lens assembly in accordance with this preferred embodiment of the present invention.

Fifth Preferred Embodiment

Figure 5A:
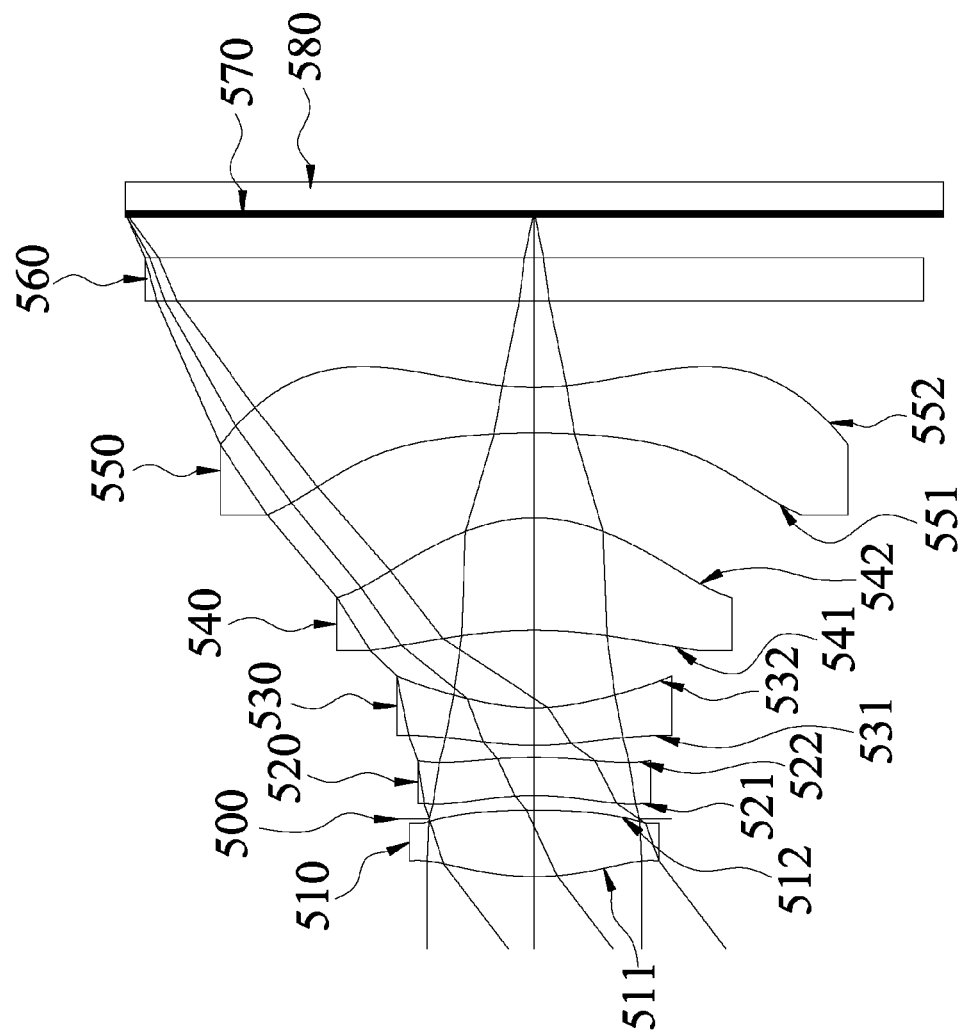
FIG. 5A is a schematic view of an optical system in accordance with the fifth preferred embodiment of the present invention.
Figure 5B:
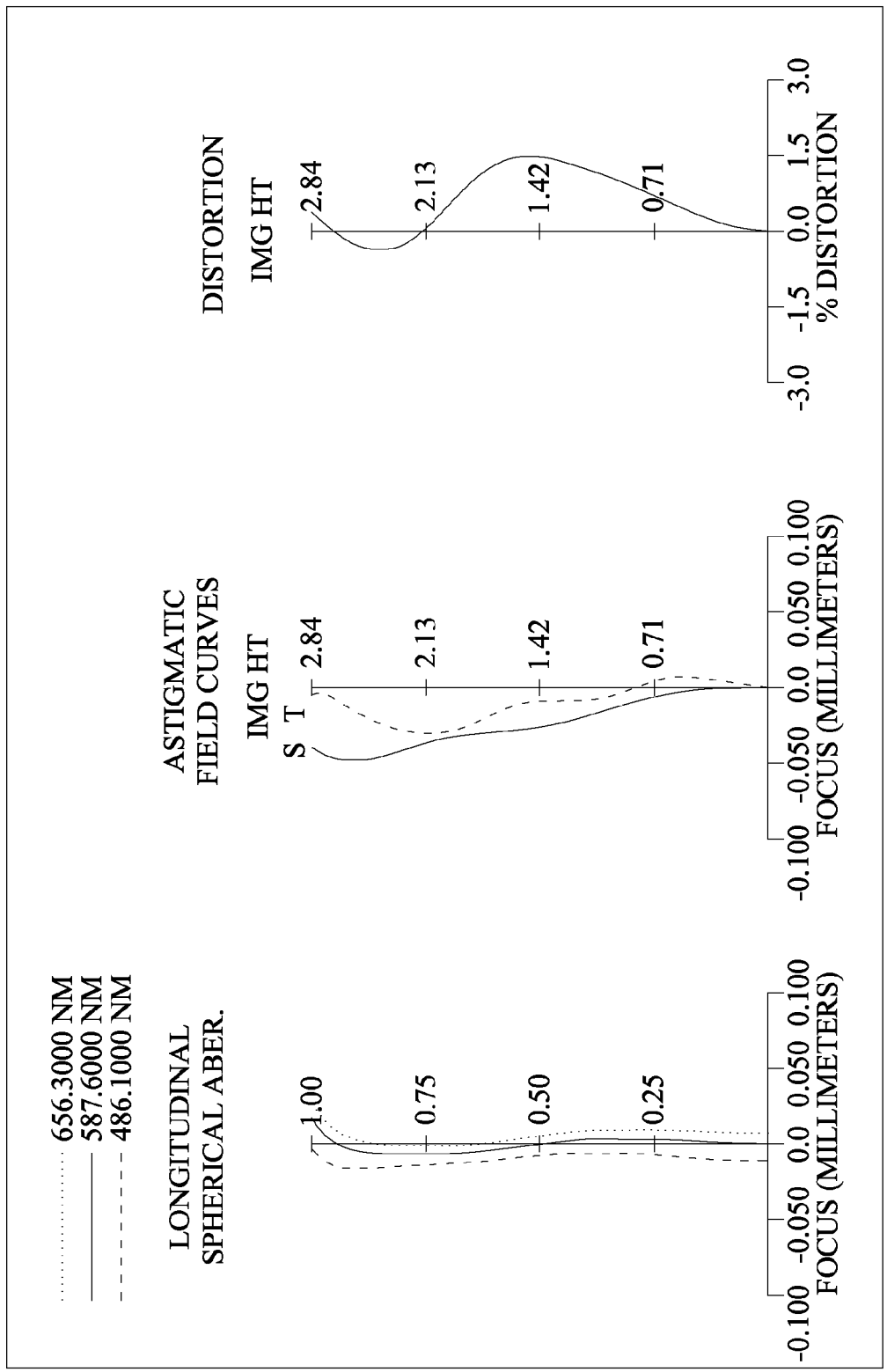
FIG. 5B is a series of aberration curves of the fifth preferred embodiment of the present invention.

With reference to FIGS. 5A and 5B for a schematic view and a series of aberration curves of an image pickup optical lens assembly in accordance with the fifth preferred embodiment of the present invention respectively, the image pickup optical lens assembly of this preferred embodiment comprises five lens elements, an infrared filter (560), an aperture (500) and an image sensor (580). The image pickup optical lens assembly, sequentially arranged from an object side to an image side along an optical axis, comprises: the first lens element (510) with positive refractive power, which is a bi-convex plastic lens, and both of its object-side surface (511) and image-side surface (512) are aspheric; the second lens element (520) with negative refractive power, which is a plastic lens provided with a concave object-side surface (521) and a convex image-side surface (522) proximate to the optical axis, and both of its object-side surface (521) and image-side surface (522) are aspheric; the third lens element (530) with negative refractive power, which is a plastic lens, provided with a concave object-side surface (531) and a convex image-side surface (532) proximate to the optical axis, and both of its object-side surface (531) and image-side surface (532) are aspheric; the fourth lens element (540) with positive refractive power, which is a plastic lens, provided with a concave object-side surface (541) and a convex image-side surface (542), and both of its object-side surface (541) and image-side surface (542) are aspheric; the fifth lens element (550) with negative refractive power, which is a plastic lens, provided with a concave object-side surface (551) and a concave image-side surface (552) proximate to the optical axis, and both of its object-side surface (551) and image-side surface (552) are aspheric, and the image-side surface (552) of the fifth lens element has at least one inflection point; an infrared filter (IR-filter) (560) made of a glass material, which is a plate glass material and will not affect the focal length of the image pickup optical lens assembly of the present invention; and an image sensor (580) installed at an image plane (570). In this preferred embodiment, image pickup optical lens assembly further comprises an aperture (500) installed between the first lens element (510) and the second lens element (520).

With reference to FIG. 19 (or Table 9) for the optical data of this preferred embodiment, the object-side surface of the first lens element (511), the image-side surface of the first lens element (512), the object-side surface of the second lens element (521), the image-side surface of the second lens element (522), the object-side surface of the third lens element (531), the image-side surface of the third lens element (532), the object-side surface of the fourth lens element (541), the image-side surface of the fourth lens element (542), the object-side surface of the fifth lens element (551) and the image-side surface of the fifth lens element (552) are aspheric surfaces in compliance with the aspheric surface formula as given in Equation (15), and their aspheric coefficients are listed in FIG. 20 (or Table 10).

In the image pickup optical lens assembly in accordance with this preferred embodiment, the focal length of the whole image pickup optical system is f=3.72 (mm), the aperture value (f-number) is Fno=2.50, and half of the maximum view angle is HFOV=37.3 (degrees).

With reference to Table 9 for related data of this preferred embodiment, $R_3$ is the curvature radius of the object-side surface of the second lens element (521), $R_4$ is the curvature radius of the image-side surface of the second lens element (522), $T_{34}$ is the distance from the image-side surface of the third lens element (532) to the object-side surface of the fourth lens element (541) along the optical axis, $T_{45}$ is the distance from the image-side surface of the fourth lens element (542) to the object-side surface of the fifth lens element (551), $N_1$ is the refractive index of the first lens element (510), $N_2$ is the refractive index of the second lens element (520), and the conditions (as given in Relations (1), (2) and (3)) of $(R_3+R_4)/(R_3-R_4)=-4.41$, $T_{34}/T_{45}=0.91$, and $N_1-N_2=-0.090$ are satisfied.

In this preferred embodiment, the image pickup optical lens assembly further comprises an aperture (500) installed between the first lens element (510) and the second lens element (520), wherein if TTL is the distance from the object-side surface of the first lens element (511) to the image plane (570) along the optical axis, and an image sensor installed at the image plane, wherein ImgH is half of the diagonal length of an effective photosensitive area of the image sensor (580), then the relation (4)) of TTL/ImgH=1.59 is satisfied. If $CT_4$ is the thickness of the fourth lens element (140) of the image pickup optical lens assembly along the optical axis, and f is the focal length of the image pickup optical lens assembly, then the relation (10) of $CT_4/f=0.21$.

If $v_1$ is the Abbe number (or Abbe number) of the first lens element (510), and $v_2$ is the Abbe number of the second lens element (520), then the relation (6) of $v_1-v_2=32.1$ is satisfied. If f is the focal length of the image pickup optical lens assembly, $R_5$ is the curvature radius of the object-side surface of the third lens element (531), $R_6$ is the curvature radius of the image-side surface of the third lens element (532), and the relation (9) of $(|R_5|+|R_6|)/f=0.98$ is satisfied.

If f is the focal length of the whole image pickup optical lens assembly, $f_1$ is the focal length of the first lens element (510), $f_3$ is the focal length of the third lens element (530), $f_4$ is the focal length of the fourth lens element (540), $f_5$ is the focal length of the fifth lens element (550), then the relations (5), (8) and (11) of $|f_1/f_3|=0.28$; $f/f4=1.31$; and $|f/f_4|+|f/f_5|=2.63$ are satisfied respectively, and data of each related relation are listed in FIG. 31 (or Table 21).

From the optical data listed in FIG. 19 (which is Table 9) and the aberration curve as shown in FIG. 5B, good compensation effects of the longitudinal spherical aberration, astigmatic field curving and distortion can be achieved by the image pickup optical lens assembly in accordance with this preferred embodiment of the present invention.

Sixth Preferred Embodiment

Figure 6A:
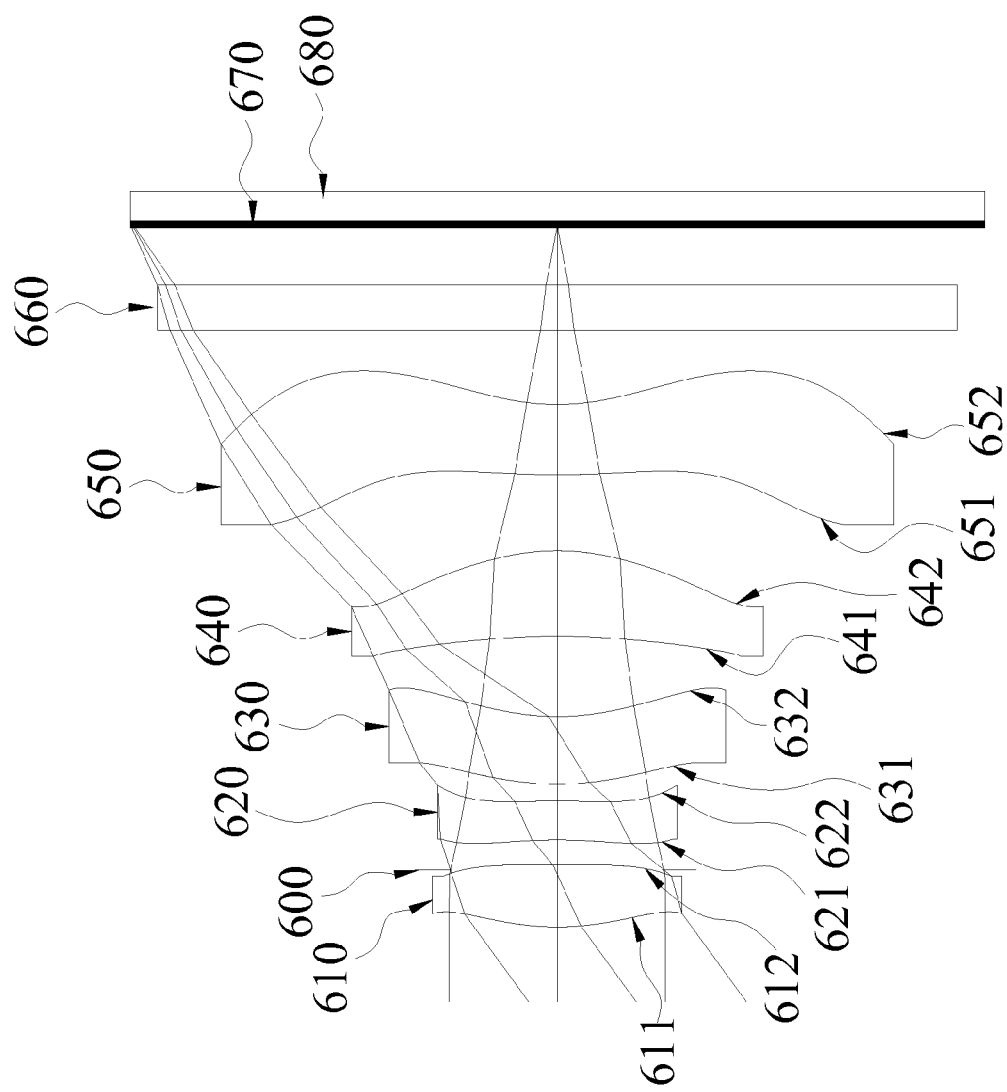
FIG. 6A is a schematic view of an optical system in accordance with the sixth preferred embodiment of the present invention.
Figure 6B:
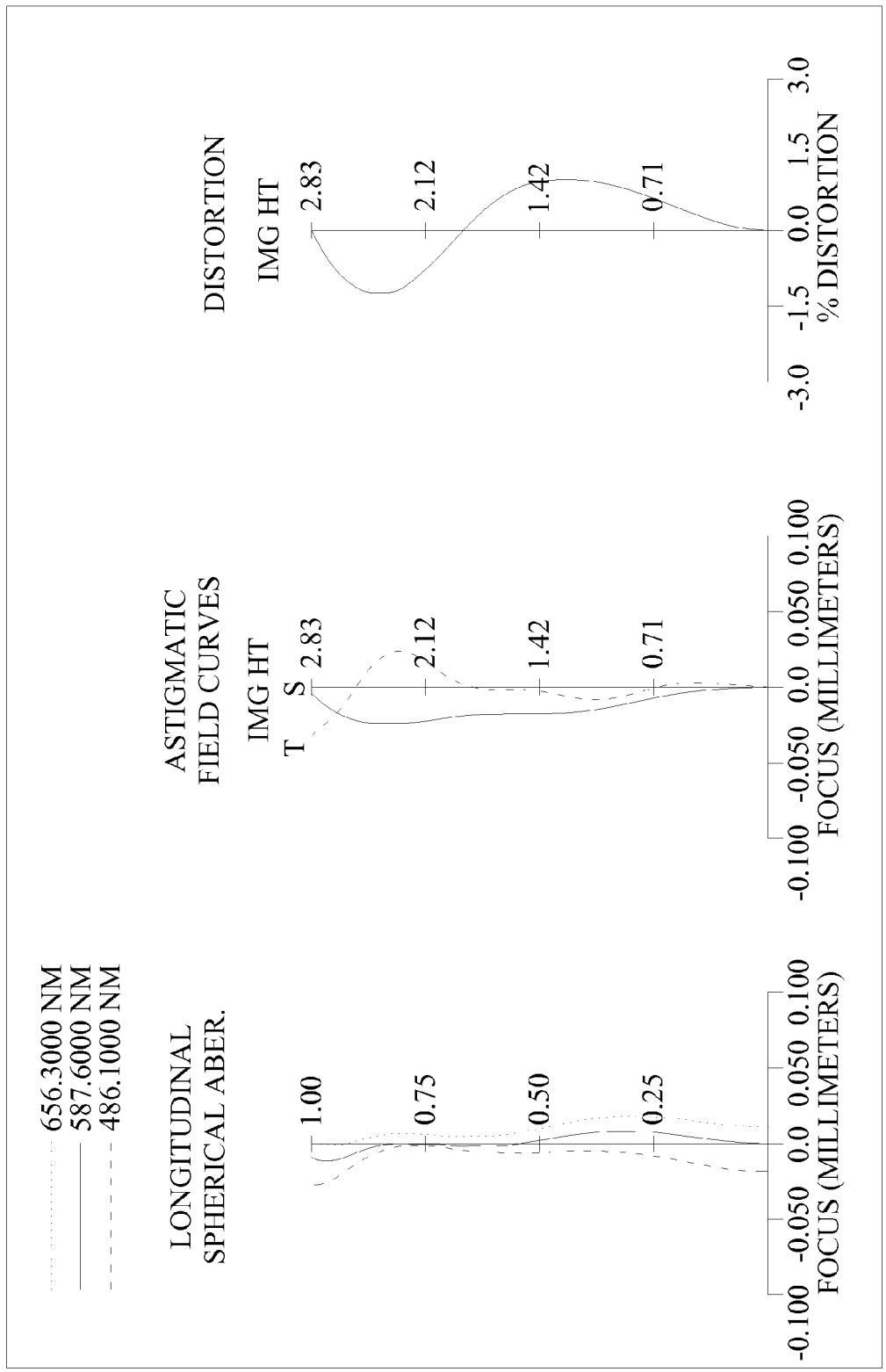
FIG. 6B is a series of aberration curves of the sixth preferred embodiment of the present invention.

With reference to FIGS. 6A and 6B for a schematic view and a series of aberration curves of an image pickup optical lens assembly in accordance with the sixth preferred embodiment of the present invention respectively, the image pickup optical lens assembly of this preferred embodiment comprises five lens elements, an infrared filter (660), an aperture (600) and an image sensor (680). The image pickup optical lens assembly, sequentially arranged from an object side to an image side along an optical axis, comprises: the first lens element (610) with positive refractive power, which is a plastic lens provided with a convex object-side surface (611) and a concave image-side surface (612) proximate to the optical axis, and both of its object-side surface (611) and image-side surface (612) are aspheric; the second lens element (620) with negative refractive power, which is a plastic lens provided with a concave object-side surface (621) and a convex image-side surface (622) proximate to the optical axis, and both of its object-side surface (621) and image-side surface (622) are aspheric; the third lens element (630) with negative refractive power, which is a plastic lens, provided with a convex object-side surface (631) and a concave image-side surface (632) proximate to the optical axis, and both of its object-side surface (631) and image-side surface (632) are aspheric; the fourth lens element (640) with positive refractive power, which is a plastic lens, provided with a concave object-side surface (641) and a convex image-side surface (642), and both of its object-side surface (641) and image-side surface (642) are aspheric; the fifth lens element (650) with negative refractive power, which is a plastic lens, provided with a convex object-side surface (651) and a concave image-side surface (652) proximate to the optical axis, and both of its object-side surface (651) and image-side surface (652) are aspheric, and the image-side surface (652) of the fifth lens element has at least one inflection point; an infrared filter (IR-filter) (660) made of a glass material, which is a plate glass material and will not affect the focal length of the image pickup optical lens assembly of the present invention; and an image sensor (680) installed at an image plane (670). In this preferred embodiment, image pickup optical lens assembly further comprises an aperture (600) installed between the first lens element (610) and the second lens element (620).

With reference to FIG. 21 (or Table 11) for the optical data of this preferred embodiment, the object-side surface of the first lens element (611), the image-side surface of the first lens element (612), the object-side surface of the second lens element (621), the image-side surface of the second lens element (622), the object-side surface of the third lens element (631), the image-side surface of the third lens element (632), the object-side surface of the fourth lens element (641), the image-side surface of the fourth lens element (642), the object-side surface of the fifth lens element (651) and the image-side surface of the fifth lens element (652) are aspheric surfaces in compliance with the aspheric surface formula as given in Equation (15), and their aspheric coefficients are listed in FIG. 22 (or Table 12).

In the image pickup optical lens assembly in accordance with this preferred embodiment, the focal length of the whole image pickup optical system is f=3.90 (mm), the aperture value (f-number) is Fno=2.70, and half of the maximum view angle is HFOV=36.0 (degrees).

With reference to Table 11 for related data of this preferred embodiment, $R_3$ is the curvature radius of the object-side surface of the second lens element (621), $R_4$ is the curvature radius of the image-side surface of the second lens element (622), $T_{34}$ is the distance from the image-side surface of the third lens element (632) to the object-side surface of the fourth lens element (641) along the optical axis, $T_{45}$ is the distance from the image-side surface of the fourth lens element (642) to the object-side surface of the fifth lens element (651), $N_1$ is the refractive index of the first lens element (610), $N_2$ is the refractive index of the second lens element (620), and the conditions (as given in Relations (1), (2) and (3)) of $(R_3+R_4)/(R_3-R_4)=-2.76$, $T_{34}/T_{45}=1.06$, and $N_1-N_2=-0.106$ are satisfied.

In this preferred embodiment, the image pickup optical lens assembly further comprises an aperture (600) installed between the first lens element (610) and the second lens element (620), wherein if TTL is the distance from the object-side surface of the first lens element (611) to the image plane (670) along the optical axis, and an image sensor installed at the image plane, wherein ImgH is half of the diagonal length of an effective photosensitive area of the image sensor (680), then the relation (4)) of TTL/ImgH=1.62 is satisfied. If $CT_4$ is the thickness of the fourth lens element (140) of the image pickup optical lens assembly along the optical axis, and f is the focal length of the image pickup optical lens assembly, then the relation (10) of $CT_4/f=0.15$.

If $v_1$ is the Abbe number (or Abbe number) of the first lens element (610), and $v_2$ is the Abbe number of the second lens element (620), then the relation (6) of $v_1-v_2=34.5$ is satisfied. If f is the focal length of the image pickup optical lens assembly, $R_5$ is the curvature radius of the object-side surface of the third lens element (631), $R_6$ is the curvature radius of the image-side surface of the third lens element (632), and the relation (9) of $(|R_5|+|R_6|)/f=0.90$ is satisfied.

If f is the focal length of the whole image pickup optical lens assembly, $f_1$ is the focal length of the first lens element (610), $f_3$ is the focal length of the third lens element (630), $f_4$ is the focal length of the fourth lens element (640), $f_5$ is the focal length of the fifth lens element (650), then the relations (5), (8) and (11) of $|f_1/f_3|=0.06$; $f/f4=1.01$; and $|f/f_4|+|f/f_5|=2.02$ are satisfied respectively, and data of each related relation are listed in FIG. 31 (or Table 21).

From the optical data listed in FIG. 21 (which is Table 11) and the aberration curve as shown in FIG. 6B, good compensation effects of the longitudinal spherical aberration, astigmatic field curving and distortion can be achieved by the image pickup optical lens assembly in accordance with this preferred embodiment of the present invention.

Seventh Preferred Embodiment

Figure 7A:
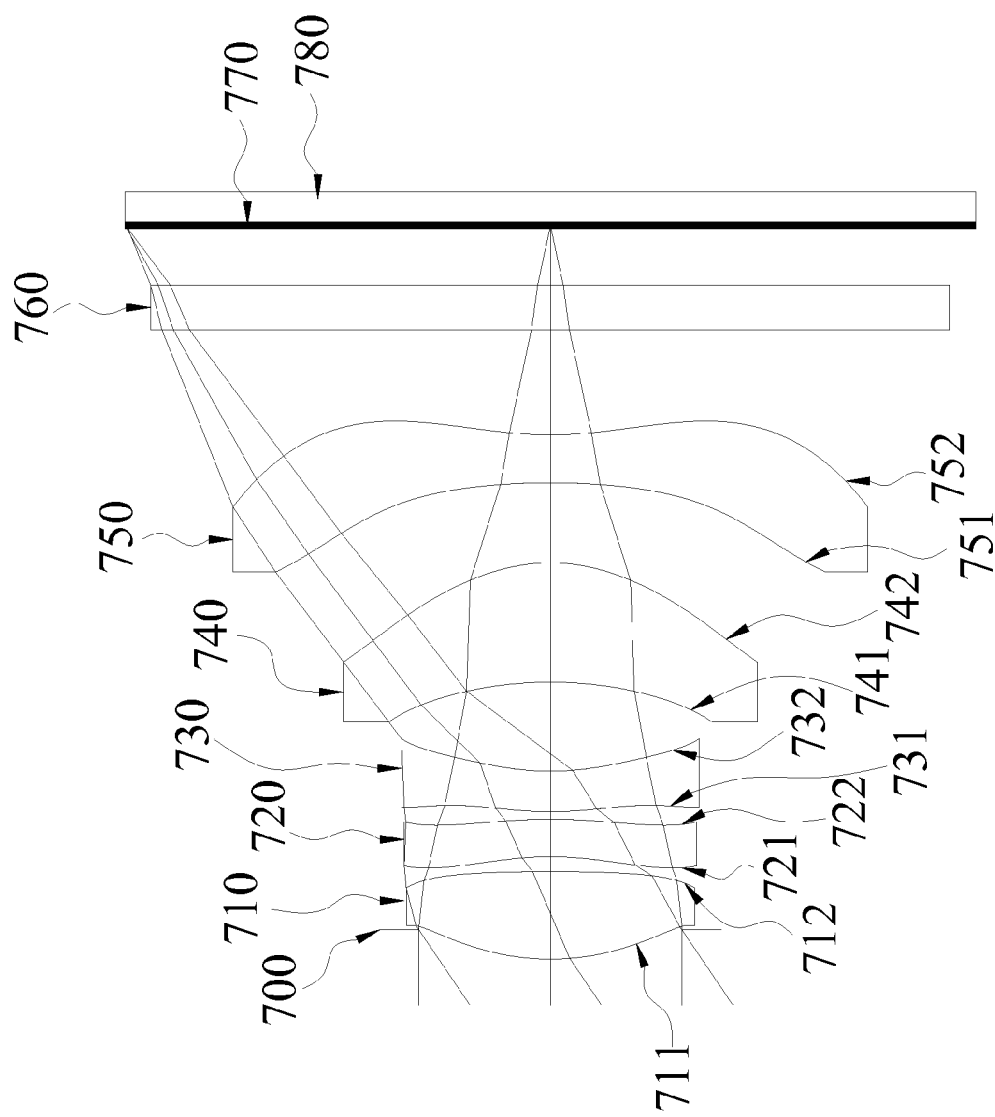
FIG. 7A is a schematic view of an optical system in accordance with the seventh preferred embodiment of the present invention.
Figure 7B:
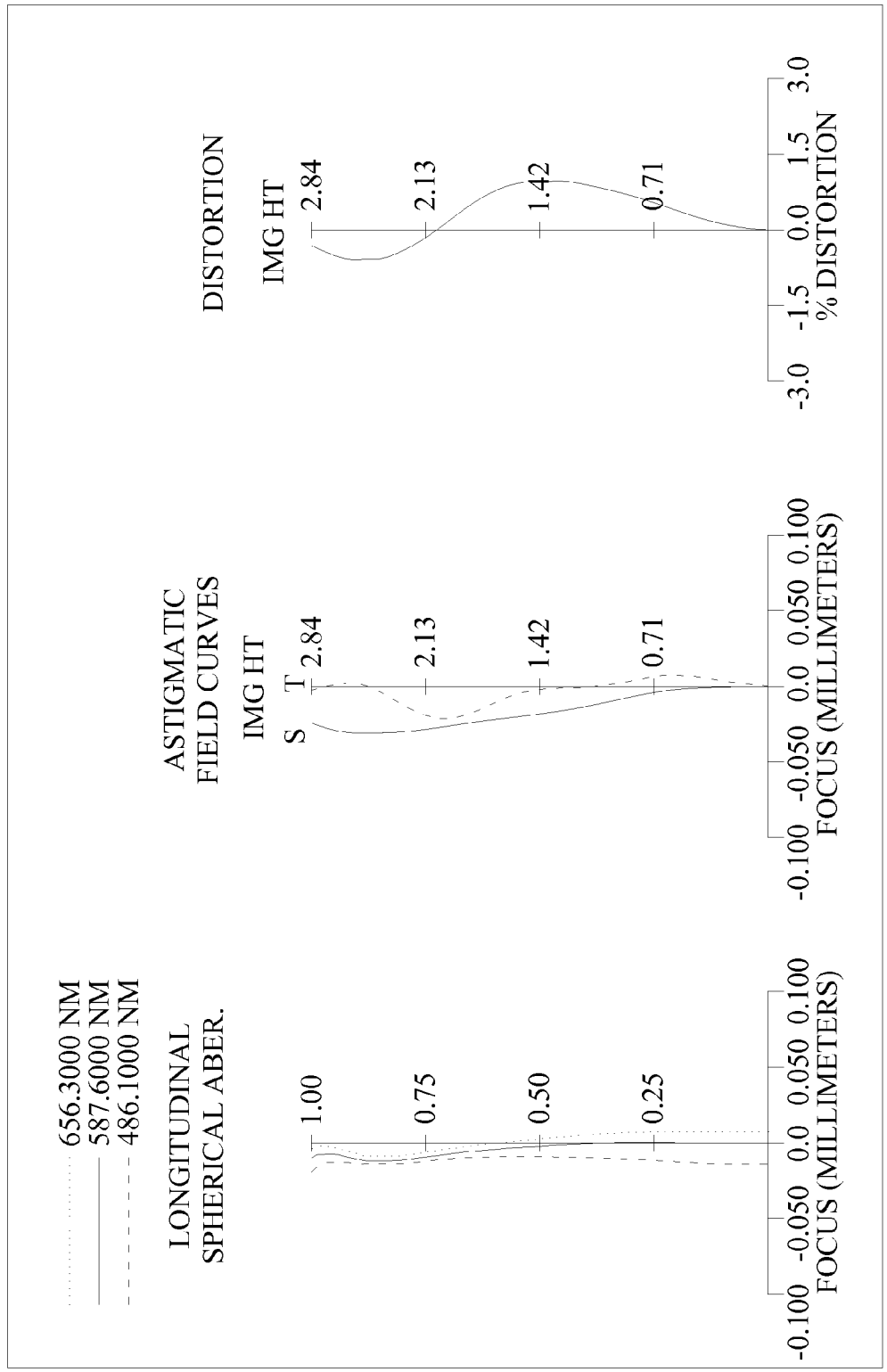
FIG. 7B is a series of aberration curves of the seventh preferred embodiment of the present invention.

With reference to FIGS. 7A and 7B for a schematic view and a series of aberration curves of an image pickup optical lens assembly in accordance with the seventh preferred embodiment of the present invention respectively, the image pickup optical lens assembly of this preferred embodiment comprises five lens elements, an infrared filter (760), an aperture (700) and an image sensor (780). The image pickup optical lens assembly, sequentially arranged from an object side to an image side along an optical axis, comprises: the first lens element (710) with positive refractive power, which is a plastic lens provided with a convex object-side surface (711) and a convex image-side surface (712) proximate to the optical axis, and both of its object-side surface (711) and image-side surface (712) are aspheric; the second lens element (720) with negative refractive power, which is a plastic lens provided with a concave object-side surface (721) and a convex image-side surface (722) proximate to the optical axis, and both of its object-side surface (721) and image-side surface (722) are aspheric; the third lens element (730) with negative refractive power, which is a plastic lens, provided with a convex object-side surface (731) and a concave image-side surface (732) proximate to the optical axis, and both of its object-side surface (731) and image-side surface (732) are aspheric; the fourth lens element (740) with positive refractive power, which is a plastic lens, provided with a concave object-side surface (741) and a convex image-side surface (742), and both of its object-side surface (741) and image-side surface (742) are aspheric; the fifth lens element (750) with negative refractive power, which is a plastic lens, provided with a concave object-side surface (751) and a concave image-side surface (752) proximate to the optical axis, and both of its object-side surface (751) and image-side surface (752) are aspheric, and the image-side surface (752) of the fifth lens element has at least one inflection point; an infrared filter (IR-filter) (760) made of a glass material, which is a plate glass material and will not affect the focal length of the image pickup optical lens assembly of the present invention; and an image sensor (780) installed at an image plane (770). In this preferred embodiment, image pickup optical lens assembly further comprises an aperture (700) installed between the first lens element (710) and an object to be photographed.

With reference to FIG. 23 (or Table 13) for the optical data of this preferred embodiment, the object-side surface of the first lens element (711), the image-side surface of the first lens element (712), the object-side surface of the second lens element (721), the image-side surface of the second lens element (722), the object-side surface of the third lens element (731), the image-side surface of the third lens element (732), the object-side surface of the fourth lens element (741), the image-side surface of the fourth lens element (742), the object-side surface of the fifth lens element (751) and the image-side surface of the fifth lens element (752) are aspheric surfaces in compliance with the aspheric surface formula as given in Equation (15), and their aspheric coefficients are listed in FIG. 24 (or Table 14).

In the image pickup optical lens assembly in accordance with this preferred embodiment, the focal length of the whole image pickup optical system is f=4.21 (mm), the aperture value (f-number) is Fno=2.40, and half of the maximum view angle is HFOV=34.1 (degrees).

With reference to Table 13 for related data of this preferred embodiment, $R_3$ is the curvature radius of the object-side surface of the second lens element (721), $R_4$ is the curvature radius of the image-side surface of the second lens element (722), $T_{34}$ is the distance from the image-side surface of the third lens element (732) to the object-side surface of the fourth lens element (741) along the optical axis, $T_{45}$ is the distance from the image-side surface of the fourth lens element (742) to the object-side surface of the fifth lens element (751), $N_1$ is the refractive index of the first lens element (710), $N_2$ is the refractive index of the second lens element (720), and the conditions (as given in Relations (1), (2) and (3)) of $(R_3+R_4)/(R_3-R_4)=-3.92$, $T_{34}/T_{45}=1.11$, and $N_1-N_2=-0.088$ are satisfied.

In this preferred embodiment, the image pickup optical lens assembly further comprises an aperture (700) installed between the first lens element (710) and an object to be photographed, wherein if TTL is the distance from the object-side surface of the first lens element (711) to the image plane (770) along the optical axis, and an image sensor installed at the image plane, wherein ImgH is half of the diagonal length of an effective photosensitive area of the image sensor (780), then the relation (4)) of TTL/ImgH=1.69 is satisfied. If $CT_4$ is the thickness of the fourth lens element (140) of the image pickup optical lens assembly along the optical axis, and f is the focal length of the image pickup optical lens assembly, then the relation (10) of $CT_4/f=0.19$.

If $v_1$ is the Abbe number (or Abbe number) of the first lens element (710), and $v_2$ is the Abbe number of the second lens element (720), then the relation (6) of $v_1-v_2=32.5$ is satisfied. If f is the focal length of the image pickup optical lens assembly, $R_5$ is the curvature radius of the object-side surface of the third lens element (731), $R_6$ is the curvature radius of the image-side surface of the third lens element (732), and the relation (9) of $(|R_5|+|R_6|)/f=0.95$ is satisfied.

If f is the focal length of the whole image pickup optical lens assembly, $f_1$ is the focal length of the first lens element (710), $f_3$ is the focal length of the third lens element (730), $f_4$ is the focal length of the fourth lens element (740), $f_5$ is the focal length of the fifth lens element (750), then the relations (5), (8) and (11) of $|f_1/f_3|=0.20$; $f/f4=1.30$; and $|f/f_4|+|f/f_5|=2.68$ are satisfied respectively, and data of each related relation are listed in FIG. 31 (or Table 21).

From the optical data listed in FIG. 23 (which is Table 13) and the aberration curve as shown in FIG. 7B, good compensation effects of the longitudinal spherical aberration, astigmatic field curving and distortion can be achieved by the image pickup optical lens assembly in accordance with this preferred embodiment of the present invention.

Eighth Preferred Embodiment

Figure 8A:
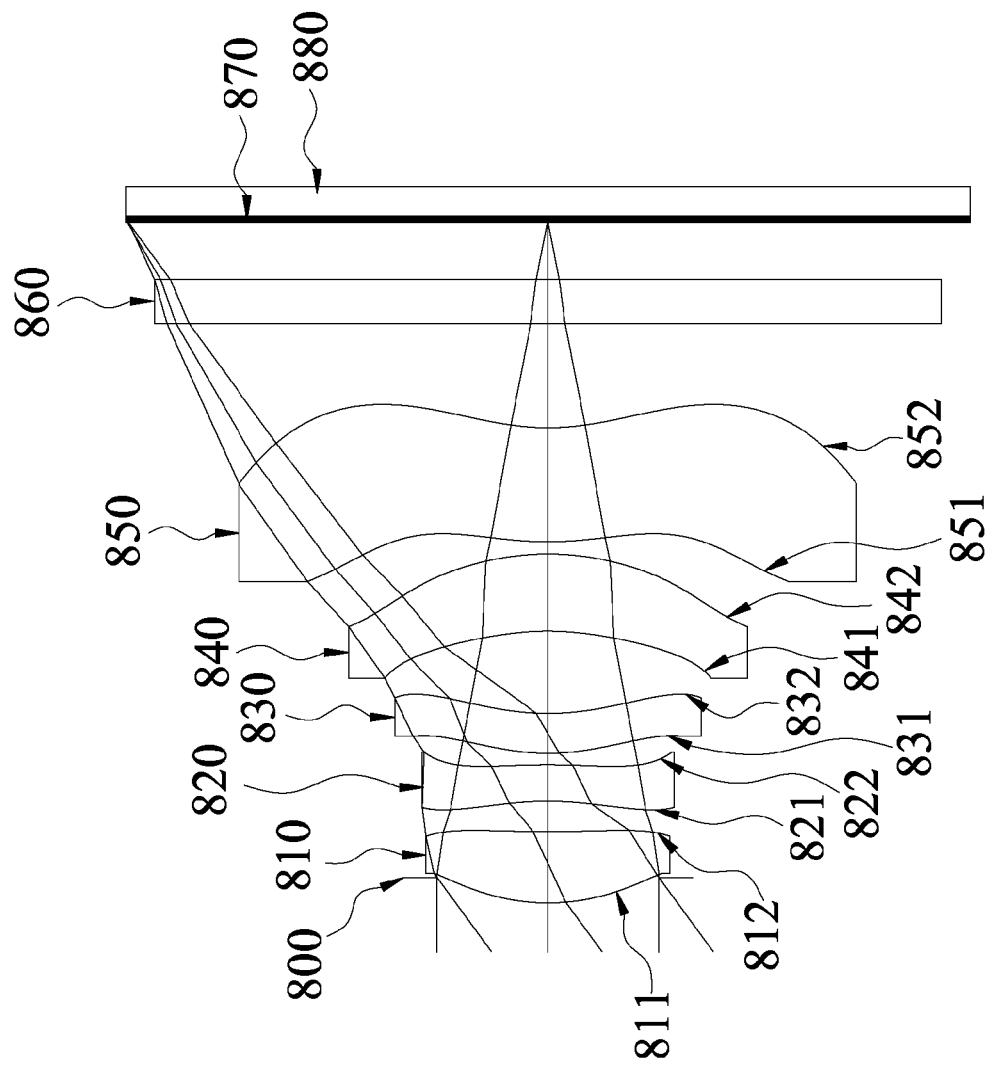
FIG. 8A is a schematic view of an optical system in accordance with the eighth preferred embodiment of the present invention.
Figure 8B:
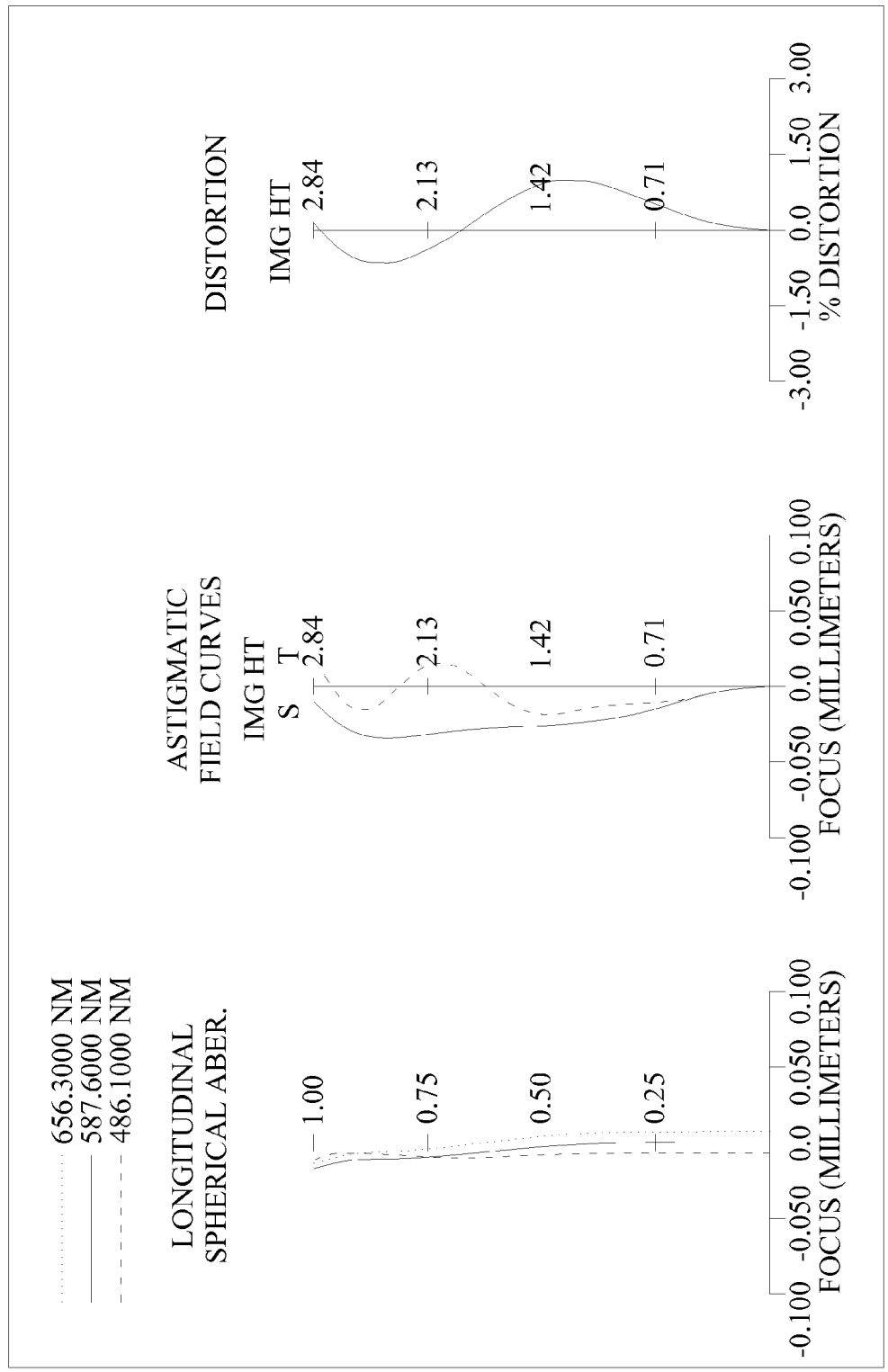
FIG. 8B is a series of aberration curves of the eighth preferred embodiment of the present invention.

With reference to FIGS. 8A and 8B for a schematic view and a series of aberration curves of an image pickup optical lens assembly in accordance with the eighth preferred embodiment of the present invention respectively, the image pickup optical lens assembly of this preferred embodiment comprises five lens elements, an infrared filter (860), an aperture (800) and an image sensor (880). The image pickup optical lens assembly, sequentially arranged from an object side to an image side along an optical axis, comprises: the first lens element (810) with positive refractive power, which is a plastic lens provided with a convex object-side surface (811) and a concave image-side surface (812) proximate to the optical axis, and both of its object-side surface (811) and image-side surface (812) are aspheric; the second lens element (820) with negative refractive power, which is a plastic lens provided with a concave object-side surface (821) and a convex image-side surface (822) proximate to the optical axis, and both of its object-side surface (821) and image-side surface (822) are aspheric; the third lens element (830) with negative refractive power, which is a plastic lens, provided with a convex object-side surface (831) and a concave image-side surface (832) proximate to the optical axis, and both of its object-side surface (831) and image-side surface (832) are aspheric; the fourth lens element (840) with positive refractive power, which is a plastic lens, provided with a concave object-side surface (841) and a convex image-side surface (842), and both of its object-side surface (841) and image-side surface (842) are aspheric; the fifth lens element (850) with negative refractive power, which is a plastic lens, provided with a convex object-side surface (851) and a concave image-side surface (852) proximate to the optical axis, and both of its object-side surface (851) and image-side surface (852) are aspheric, and the image-side surface (852) of the fifth lens element has at least one inflection point; an infrared filter (IR-filter) (860) made of a glass material, which is a plate glass material and will not affect the focal length of the image pickup optical lens assembly of the present invention; and an image sensor (880) installed at an image plane (870). In this preferred embodiment, image pickup optical lens assembly further comprises an aperture (800) installed between the first lens element (810) and an object to be photographed.

With reference to FIG. 25 (or Table 15) for the optical data of this preferred embodiment, the object-side surface of the first lens element (811), the image-side surface of the first lens element (812), the object-side surface of the second lens element (821), the image-side surface of the second lens element (822), the object-side surface of the third lens element (831), the image-side surface of the third lens element (832), the object-side surface of the fourth lens element (841), the image-side surface of the fourth lens element (842), the object-side surface of the fifth lens element (851) and the image-side surface of the fifth lens element (852) are aspheric surfaces in compliance with the aspheric surface formula as given in Equation (15), and their aspheric coefficients are listed in FIG. 26 (or Table 16).

In the image pickup optical lens assembly in accordance with this preferred embodiment, the focal length of the whole image pickup optical system is f=3.87 (mm), the aperture value (f-number) is Fno=2.60, and half of the maximum view angle is HFOV=36.2 (degrees).

With reference to Table 15 for related data of this preferred embodiment, $R_3$ is the curvature radius of the object-side surface of the second lens element (821), $R_4$ is the curvature radius of the image-side surface of the second lens element (822), $T_{34}$ is the distance from the image-side surface of the third lens element (832) to the object-side surface of the fourth lens element (841) along the optical axis, $T_{45}$ is the distance from the image-side surface of the fourth lens element (842) to the object-side surface of the fifth lens element (851), $N_1$ is the refractive index of the first lens element (810), $N_2$ is the refractive index of the second lens element (820), and the conditions (as given in Relations (1), (2) and (3)) of $(R_3+R_4)/(R_3-R_4)=-2.52$, $T_{34}/T_{45}=6.75$, and $N_1-N_2=-0.016$ are satisfied.

In this preferred embodiment, the image pickup optical lens assembly further comprises an aperture (800) installed between the first lens element (810) and an object to be photographed, wherein if TTL is the distance from the object-side surface of the first lens element (811) to the image plane (870) along the optical axis, and an image sensor installed at the image plane, wherein ImgH is half of the diagonal length of an effective photosensitive area of the image sensor (880), then the relation (4)) of TTL/ImgH=1.59 is satisfied. If $CT_4$ is the thickness of the fourth lens element (140) of the image pickup optical lens assembly along the optical axis, and f is the focal length of the image pickup optical lens assembly, then the relation (10) of $CT_4/f=0.14$.

If $v_1$ is the Abbe number (or Abbe number) of the first lens element (810), and $v_2$ is the Abbe number of the second lens element (820), then the relation (6) of $v_1-v_2=34.5$ is satisfied. If f is the focal length of the image pickup optical lens assembly, $R_5$ is the curvature radius of the object-side surface of the third lens element (831), $R_6$ is the curvature radius of the image-side surface of the third lens element (832), and the relation (9) of $(|R_5|+|R_6|)/f=0.82$ is satisfied.

If f is the focal length of the whole image pickup optical lens assembly, $f_1$ is the focal length of the first lens element (810), $f_3$ is the focal length of the third lens element (830), $f_4$ is the focal length of the fourth lens element (840), $f_5$ is the focal length of the fifth lens element (850), then the relations (5), (8) and (11) of $|f_1/f_3|=0.23$; $f/f_4=0.15$; and $|f/f_4|+|f/f_5|=0.34$ are satisfied respectively, and data of each related relation are listed in FIG. 31 (or Table 21).

From the optical data listed in FIG. 25 (which is Table 15) and the aberration curve as shown in FIG. 8B, good compensation effects of the longitudinal spherical aberration, astigmatic field curving and distortion can be achieved by the image pickup optical lens assembly in accordance with this preferred embodiment of the present invention.

Ninth Preferred Embodiment

Figure 9A:
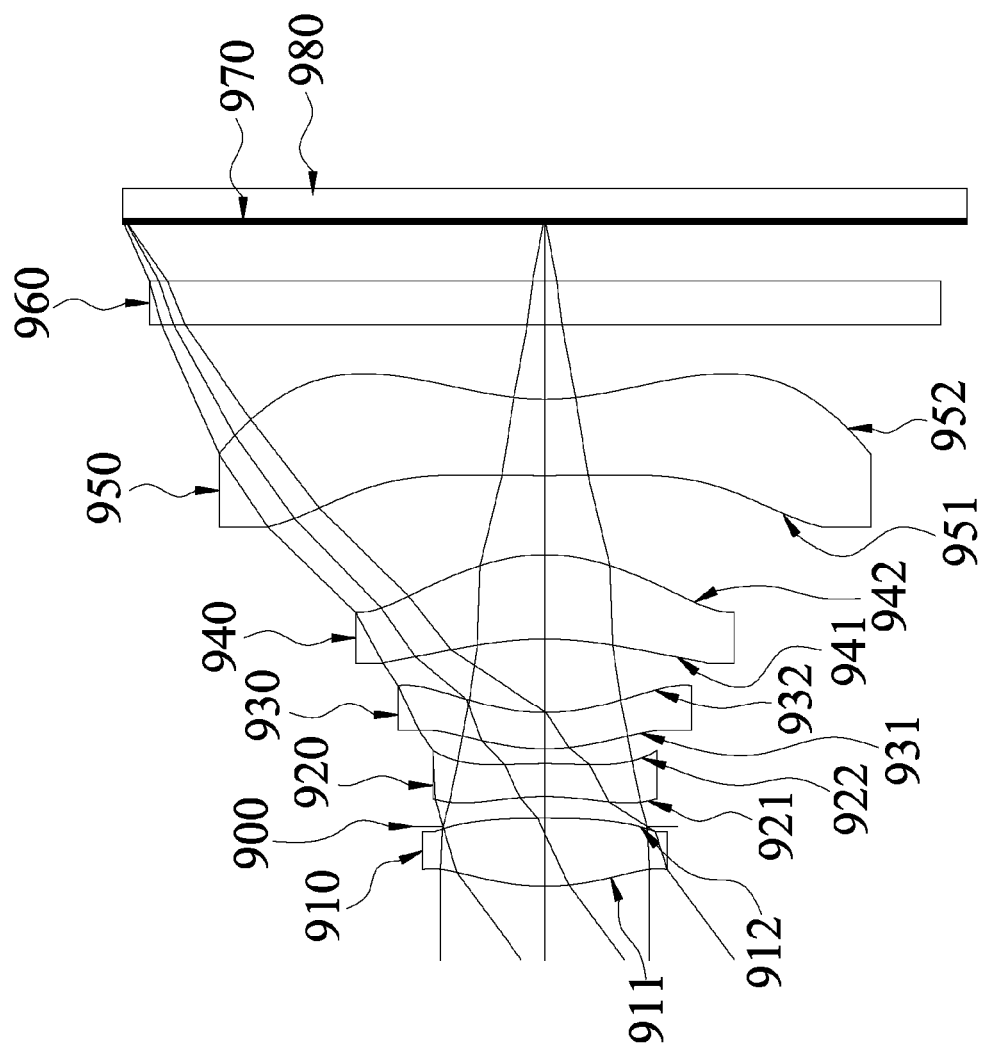
FIG. 9A is a schematic view of an optical system in accordance with the ninth preferred embodiment of the present invention.
Figure 9B:
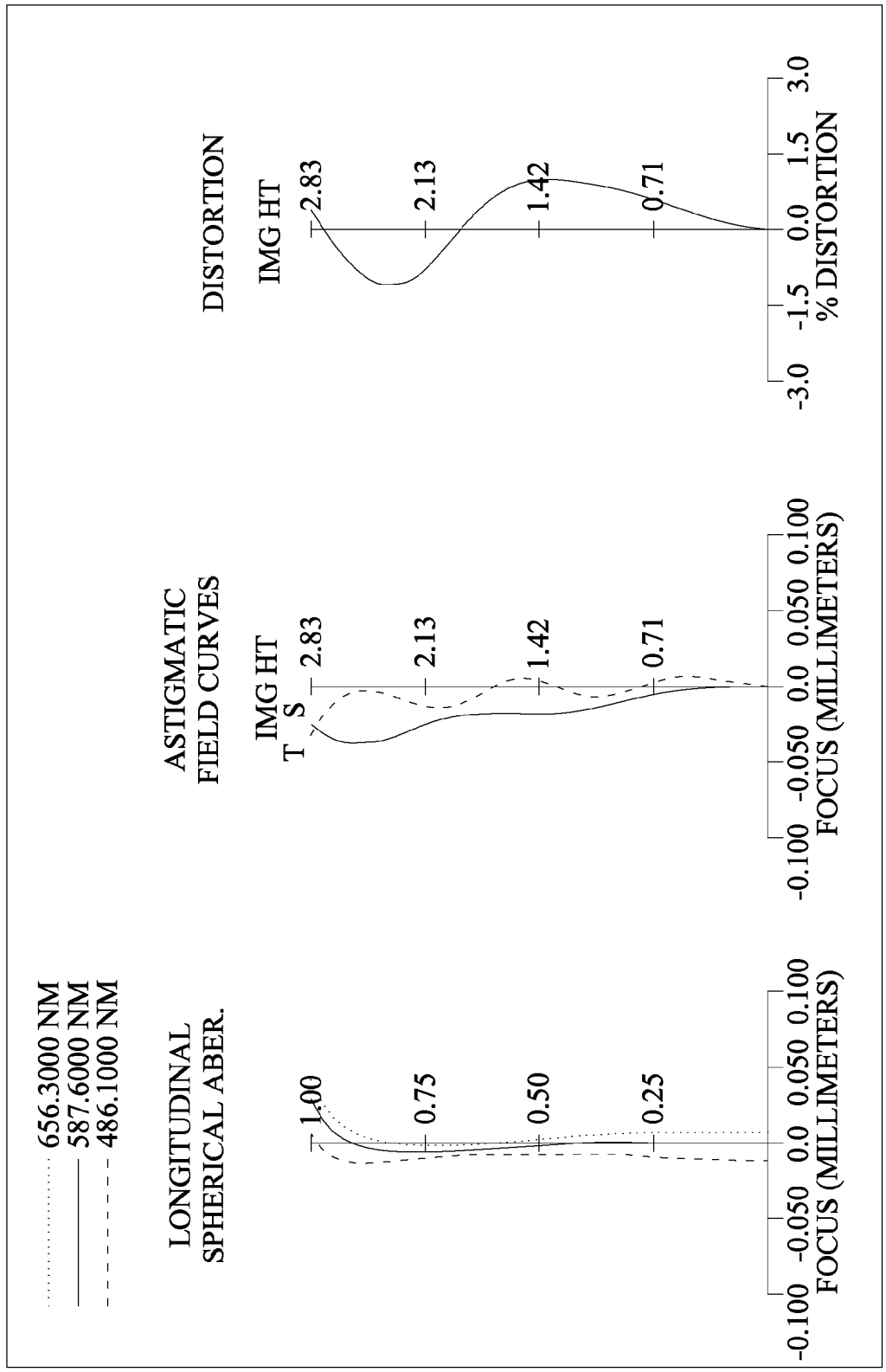
FIG. 9B is a series of aberration curves of the ninth preferred embodiment of the present invention.

With reference to FIGS. 9A and 9B for a schematic view and a series of aberration curves of an image pickup optical lens assembly in accordance with the ninth preferred embodiment of the present invention respectively, the image pickup optical lens assembly of this preferred embodiment comprises five lens elements, an infrared filter (960), an aperture (900) and an image sensor (980). The image pickup optical lens assembly, sequentially arranged from an object side to an image side along an optical axis, comprises: the first lens element (910) with positive refractive power, which is a plastic lens provided with a convex object-side surface (911) and a convex image-side surface (912) proximate to the optical axis, and both of its object-side surface (911) and image-side surface (912) are aspheric; the second lens element (920) with negative refractive power, which is a plastic lens provided with a concave object-side surface (921) and a convex image-side surface (922) proximate to the optical axis, and both of its object-side surface (921) and image-side surface (922) are aspheric; the third lens element (930) with negative refractive power, which is a plastic lens, provided with a convex object-side surface (931) and a concave image-side surface (932) proximate to the optical axis, and both of its object-side surface (931) and image-side surface (932) are aspheric; the fourth lens element (940) with positive refractive power, which is a plastic lens, provided with a concave object-side surface (941) and a convex image-side surface (942), and both of its object-side surface (941) and image-side surface (942) are aspheric; the fifth lens element (950) with negative refractive power, which is a plastic lens, provided with a convex object-side surface (951) and a concave image-side surface (952) proximate to the optical axis, and both of its object-side surface (951) and image-side surface (952) are aspheric, and the image-side surface (952) of the fifth lens element has at least one inflection point; an infrared filter (IR-filter) (960) made of a glass material, which is a plate glass material and will not affect the focal length of the image pickup optical lens assembly of the present invention; and an image sensor (980) installed at an image plane (970). In this preferred embodiment, image pickup optical lens assembly further comprises an aperture (900) installed between the first lens element (910) and the second lens element (920).

With reference to FIG. 27 (or Table 17) for the optical data of this preferred embodiment, the object-side surface of the first lens element (911), the image-side surface of the first lens element (912), the object-side surface of the second lens element (921), the image-side surface of the second lens element (922), the object-side surface of the third lens element (931), the image-side surface of the third lens element (932), the object-side surface of the fourth lens element (941), the image-side surface of the fourth lens element (942), the object-side surface of the fifth lens element (951) and the image-side surface of the fifth lens element (952) are aspheric surfaces in compliance with the aspheric surface formula as given in Equation (15), and their aspheric coefficients are listed in FIG. 28 (or Table 18).

In the image pickup optical lens assembly in accordance with this preferred embodiment, the focal length of the whole image pickup optical system is f=3.81 (mm), the aperture value (f-number) is Fno=2.70, and half of the maximum view angle is HFOV=36.6 (degrees).

With reference to Table 17 for related data of this preferred embodiment, $R_3$ is the curvature radius of the object-side surface of the second lens element (921), $R_4$ is the curvature radius of the image-side surface of the second lens element (922), $T_{34}$ is the distance from the image-side surface of the third lens element (932) to the object-side surface of the fourth lens element (941) along the optical axis, $T_{45}$ is the distance from the image-side surface of the fourth lens element (942) to the object-side surface of the fifth lens element (951), $N_1$ is the refractive index of the first lens element (910), $N_2$ is the refractive index of the second lens element (920), and the conditions (as given in Relations (1), (2) and (3)) of $(R_3+R_4)/(R_3-R_4)=-2.70$, $T_{34}/T_{45}=0.94$, and $N_1-N_2=-0.090$ are satisfied.

In this preferred embodiment, the image pickup optical lens assembly further comprises an aperture (900) installed between the first lens element (910) and the second lens element (920), wherein if TTL is the distance from the object-side surface of the first lens element (911) to the image plane (970) along the optical axis, and an image sensor installed at the image plane, wherein ImgH is half of the diagonal length of an effective photosensitive area of the image sensor (980), then the relation (4)) of TTL/ImgH=1.55 is satisfied. If $CT_4$ is the thickness of the fourth lens element (140) of the image pickup optical lens assembly along the optical axis, and f is the focal length of the image pickup optical lens assembly, then the relation (10) of $CT_4/f$=0.15.

If $v_1$ is the Abbe number (or Abbe number) of the first lens element (910), and $v_2$ is the Abbe number of the second lens element (920), then the relation (6) of $v_1-v_2$=32.1 is satisfied. If f is the focal length of the image pickup optical lens assembly, $R_5$ is the curvature radius of the object-side surface of the third lens element (931), $R_6$ is the curvature radius of the image-side surface of the third lens element (932), and the relation (9) of $(|R_5|+|R_6|)/f$=0.74 is satisfied.

If f is the focal length of the whole image pickup optical lens assembly, $f_1$ is the focal length of the first lens element (910), $f_3$ is the focal length of the third lens element (930), $f_4$ is the focal length of the fourth lens element (940), $f_5$ is the focal length of the fifth lens element (950), then the relations (5), (8) and (11) of $|f_1/f_3|$=0.04; $f/f_4$=0.93; and $|f/f_4|+|f/f_5|$=1.94 are satisfied respectively, and data of each related relation are listed in FIG. 31 (or Table 21).

From the optical data listed in FIG. 27 (which is Table 17) and the aberration curve as shown in FIG. 9B, good compensation effects of the longitudinal spherical aberration, astigmatic field curving and distortion can be achieved by the image pickup optical lens assembly in accordance with this preferred embodiment of the present invention.

Tenth Preferred Embodiment

Figure 10A:
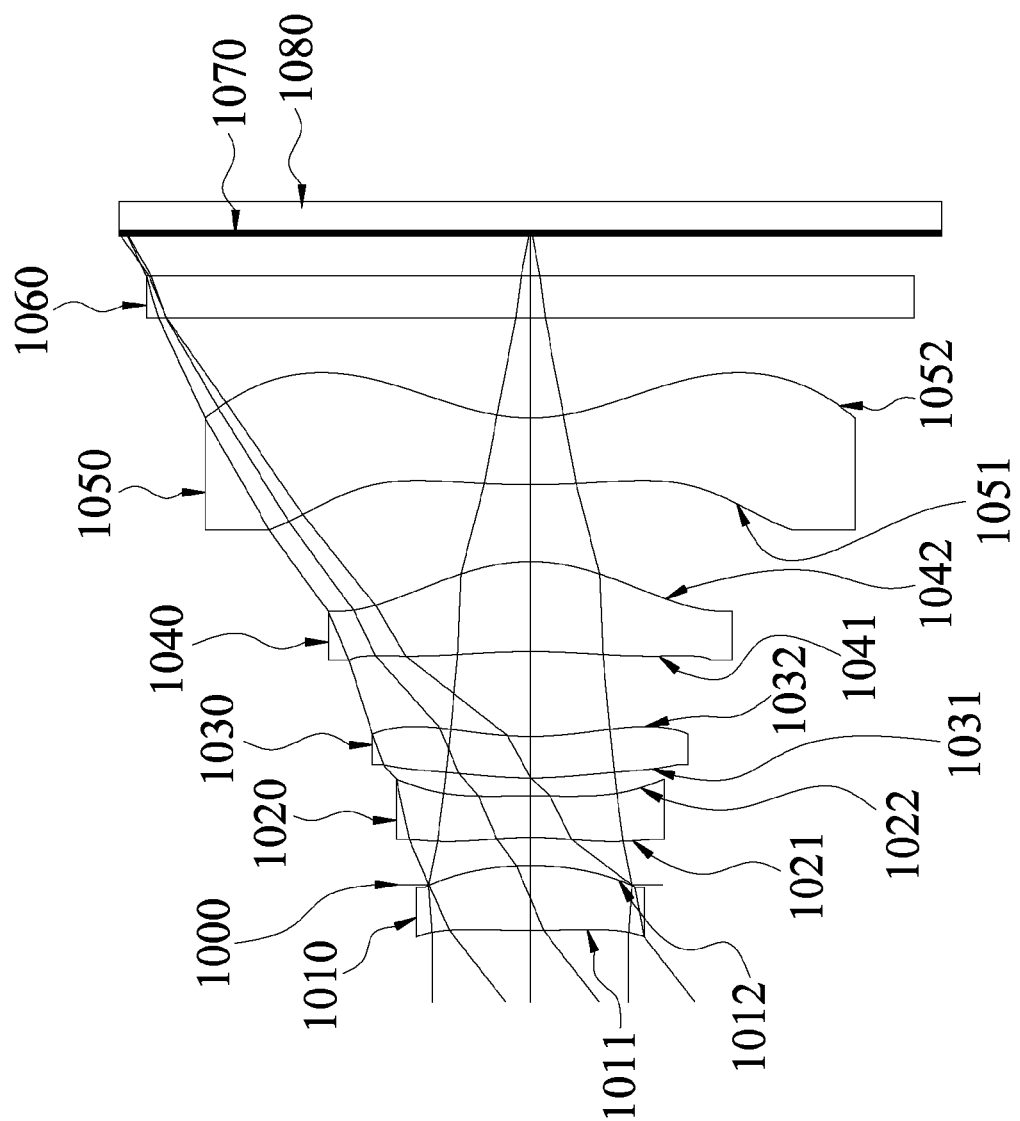
FIG. 10A is a schematic view of an optical system in accordance with the tenth preferred embodiment of the present invention.
Figure 10B:
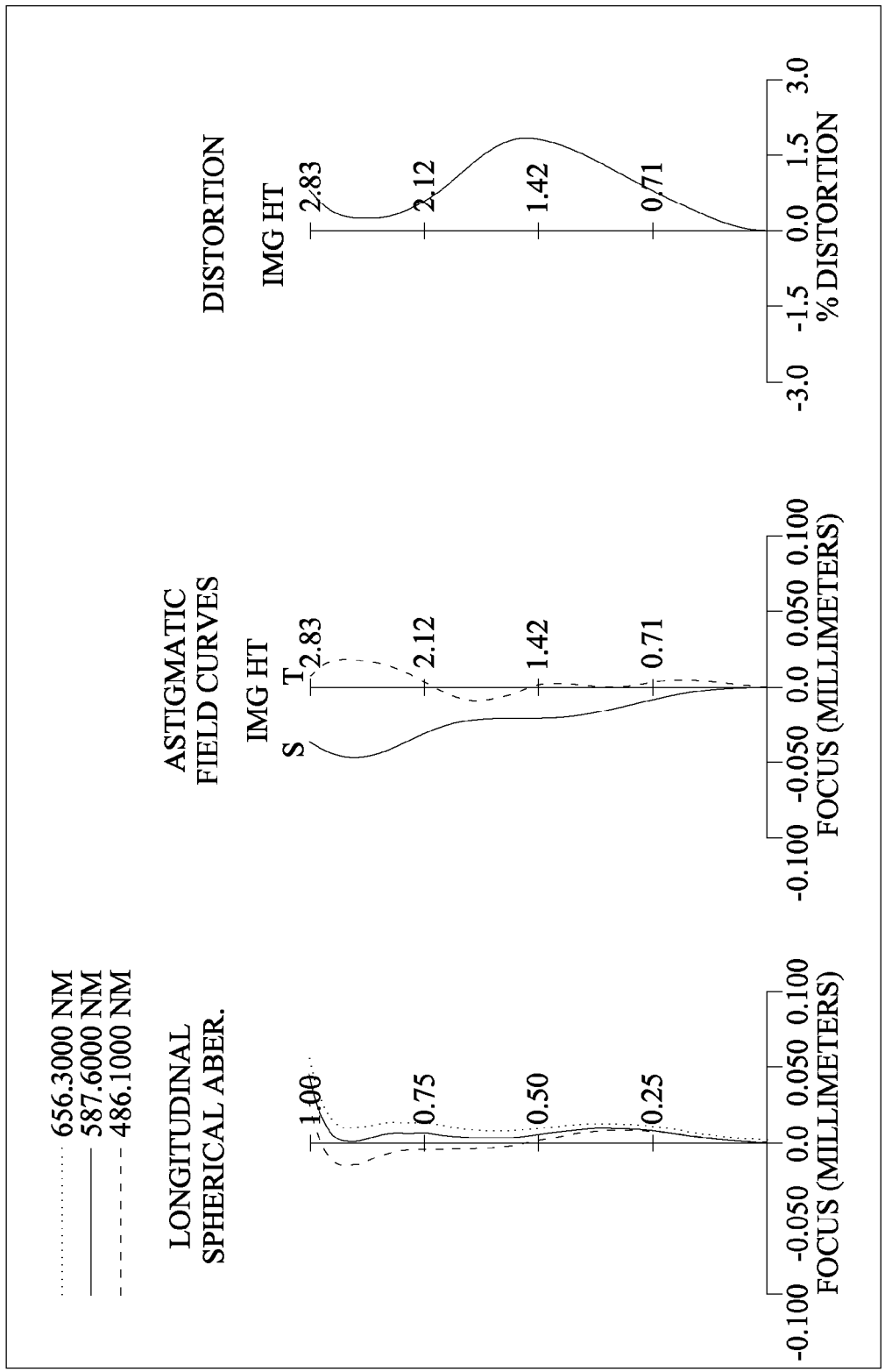
FIG. 10B is a series of aberration curves of the tenth preferred embodiment of the present invention.

With reference to FIGS. 10A and 10B for a schematic view and a series of aberration curves of an image pickup optical lens assembly in accordance with the first preferred embodiment of the present invention respectively, the image pickup optical lens assembly of this preferred embodiment comprises five lens elements, an infrared filter (1060), an aperture (1000) and an image sensor (1080). The image pickup optical lens assembly, sequentially arranged from an object side to an image side along an optical axis, comprises: the first lens element (1010) with positive refractive power, which is a plastic lens provided with a convex object-side surface (1011) and a convex image-side surface (1012) proximate to the optical axis, and both of its object-side surface (1011) and image-side surface (1012) are aspheric; the second lens element (1020) with negative refractive power, which is a plastic lens provided with a concave object-side surface (1021) and a convex image-side surface (1022) proximate to the optical axis, and both of its object-side surface (1021) and image-side surface (1022) are aspheric; the third lens element (1030) with negative refractive power, which is a plastic lens, provided with a convex object-side surface (1031) and a concave image-side surface (1032) proximate to the optical axis, and both of its object-side surface (1031) and image-side surface (1032) are aspheric; the fourth lens element (1040) with positive refractive power, which is a plastic lens, provided with a concave object-side surface (1041) and a convex image-side surface (1042), and both of its object-side surface (1041) and image-side surface (1042) are aspheric; the fifth lens element (1050) with negative refractive power, which is a plastic lens, provided with a convex object-side surface (1051) and a concave image-side surface (1052) proximate to the optical axis, and both of its object-side surface (1051) and image-side surface (1052) are aspheric, and the image-side surface (1052) of the fifth lens element has at least one inflection point; an infrared filter (IR-filter) (1060) made of a glass material, which is a plate glass material and will not affect the focal length of the image pickup optical lens assembly of the present invention; and an image sensor (1080) installed at an image plane (1070). In this preferred embodiment, image pickup optical lens assembly further comprises an aperture (1000) installed between the first lens element (1010) and the second lens element (1020).

With reference to FIG. 29 (or Table 19) for the optical data of this preferred embodiment, the object-side surface of the first lens element (1011), the image-side surface of the first lens element (1012), the object-side surface of the second lens element (1021), the image-side surface of the second lens element (1022), the object-side surface of the third lens element (1031), the image-side surface of the third lens element (1032), the object-side surface of the fourth lens element (1041), the image-side surface of the fourth lens element (1042), the object-side surface of the fifth lens element (1051) and the image-side surface of the fifth lens element (1052) are aspheric surfaces in compliance with the aspheric surface formula as given in Equation (15), and their aspheric coefficients are listed in FIG. 30 (or Table 20).

In the image pickup optical lens assembly in accordance with this preferred embodiment, the focal length of the whole image pickup optical system is f=3.59 (mm), the aperture value (f-number) is Fno=2.60, and half of the maximum view angle is HFOV=38.1 (degrees).

With reference to Table 19 for related data of this preferred embodiment, $R_3$ is the curvature radius of the object-side surface of the second lens element (1021), $R_4$ is the curvature radius of the image-side surface of the second lens element (1022), $T_{34}$ is the distance from the image-side surface of the third lens element (1032) to the object-side surface of the fourth lens element (1041) along the optical axis, $T_{45}$ is the distance from the image-side surface of the fourth lens element (1042) to the object-side surface of the fifth lens element (1051), $N_1$ is the refractive index of the first lens element (1010), $N_2$ is the refractive index of the second lens element (1020), and the conditions (as given in Relations (1), (2) and (3)) of $(R_3+R_4)/(R_3-R_4)$=−1.56, $T_{34}/T_{45}$=1.11, and $N_1-N_2$=−0.016 are satisfied.

In this preferred embodiment, the image pickup optical lens assembly further comprises an aperture (1000) installed between the first lens element (1010) and the second lens element (1020), wherein if TTL is the distance from the object-side surface of the first lens element (1011) to the image plane (1070) along the optical axis, and an image sensor installed at the image plane, wherein ImgH is half of the diagonal length of an effective photosensitive area of the image sensor (1080), then the relation (4)) of TTL/ImgH=1.69 is satisfied. If $CT_4$ is the thickness of the fourth lens element (140) of the image pickup optical lens assembly along the optical axis, and f is the focal length of the image pickup optical lens assembly, then the relation (10) of $CT_4/f$=0.18.

If $v_1$ is the Abbe number (or Abbe number) of the first lens element (1010), and $v_2$ is the Abbe number of the second lens element (1020), then the relation (6) of $v_1-v_2$=39.5 is satisfied. If f is the focal length of the image pickup optical lens assembly, $R_5$ is the curvature radius of the object-side surface of the third lens element (1031), $R_6$ is the curvature radius of the image-side surface of the third lens element (1032), and the relation (9) of $(|R_5|+|R_6|)/f$=1.43 is satisfied.

If f is the focal length of the whole image pickup optical lens assembly, $f_1$ is the focal length of the first lens element (1010), $f_3$ is the focal length of the third lens element (1030), $f_4$ is the focal length of the fourth lens element (1040), $f_5$ is the focal length of the fifth lens element (1050), then the relations (5), (8) and (11) of $|f/f_3|=0.09$; $f/f_4=1.22$; and $|f/f_4|+|f/f_5|=2.30$ are satisfied respectively, and data of each related relation are listed in FIG. 31 (or Table 21).

From the optical data listed in FIG. 29 (which is Table 19) and the aberration curve as shown in FIG. 10B, good compensation effects of the longitudinal spherical aberration, astigmatic field curving and distortion can be achieved by the image pickup optical lens assembly in accordance with this preferred embodiment of the present invention.

In the image pickup optical lens assembly of the present invention, the lens can be made of a glass or plastic material. If the lens is made of a glass material, the refractive power of the image pickup optical lens assembly can be selected more flexibly. If the lens is made of a plastic material, the production cost can be reduced effectively. In addition, an aspherical surface can be formed on an optical surface of the lens, and the aspherical surface can be easily manufactured into a non-spherical shape to have more control factors to eliminate or reduce aberrations, so as to reduce the number of lenses used and the total length of the image pickup optical lens assembly of the present invention.

In the image pickup optical lens assembly of the present invention, if the lens surface is a convex surface, the lens surface proximate to the optical axis is a convex surface; and if the lens surface is a concave surface, the lens surface proximate to the optical axis is a concave surface.

In the image pickup optical lens assembly of the present invention, at least one stop (not shown in the figure) can be provided for reducing stray lights and improving the image quality.

Tables 1 to 21 (corresponding to FIGS. 11 to 30 respectively) show changes of values of an image pickup optical lens assembly in accordance with preferred embodiments of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those generally skilled in the art without departing from the scope and spirit of the invention set forth in the claims.

What is claimed is:

1. An image pickup optical lens assembly, sequentially arranged from an object side to an image side, comprising:
   a first lens element with positive refractive power, having a convex object-side surface;
   a second lens element with negative refractive power, having a concave object-side surface and a convex image-side surface;
   a third lens element with refractive power;
   a fourth lens element with positive refractive power, having a concave object-side surface and a convex image-side surface; and
   a fifth lens element with negative refractive power, having a concave image-side surface, and both object-side surface and image-side surface being aspheric, and the image-side surface of the fifth lens element having at least one inflection point;

wherein, $R_3$ is a curvature radius of the object-side surface of the second lens element, $R_4$ is a curvature radius of the image-side surface of the second lens element, $T_{34}$ is an axial distance between the third lens element and the fourth lens element, $T_{45}$ is an axial distance between the fourth lens element and the fifth lens element, $N_1$ is a refractive index of the first lens element, $N_2$ is a refractive index of the second lens element, and the following relations are satisfied:

$$-6.0<(R_3+R_4)/(R_3-R_4)<-1.0;$$

$$0.3<T_{34}/T_{45}<2.5;$$

$$-0.25<N_1-N_2<0.$$

2. The image pickup optical lens assembly of claim 1, wherein both the object-side surface and the image-side surface of the fourth lens element are aspheric, and the fourth lens element and the fifth lens element are made of plastic.

3. The image pickup optical lens assembly of claim 2, wherein $f_1$ is a focal length of the first lens element, $f_3$ is a focal length of the third lens element, and the following relation is satisfied:

$$|f_1/f_3|<0.75.$$

4. The image pickup optical lens assembly of claim 3, wherein $v_1$ is an Abbe number of the first lens element, $v_2$ is an Abbe number of the second lens element, and the following relation:

$$28<v_1-v_2<45.$$

5. The image pickup optical lens assembly of claim 4, wherein $R_3$ is the curvature radius of the object-side surface of the second lens element, $R_4$ is the curvature radius of the image-side surface of the second lens element, and the following relation is satisfied:

$$-4.0<(R_3+R_4)/(R_3-R_4)<-1.0.$$

6. The image pickup optical lens assembly of claim 4, wherein f is a focal length of the image pickup optical lens assembly, $f_4$ is a focal length of the fourth lens element, and the following relation is satisfied:

$$0<f/f_4<2.0.$$

7. The image pickup optical lens assembly of claim 4, wherein f is a focal length of the image pickup optical lens assembly, $R_5$ is a curvature radius of the object-side surface of the third lens element, $R_6$ is a curvature radius of the image-side surface of the third lens element, and the following relation is satisfied:

$$(|R_5|+|R_6|)/f<4.0.$$

8. The image pickup optical lens assembly of claim 7, wherein the third lens element has a concave image-side surface.

9. The image pickup optical lens assembly of claim 7, wherein f is the focal length of the image pickup optical lens assembly, $CT_4$ is a thickness of the fourth lens element near the optical axis, and the following relation is satisfied:

$$0.04<CT_4/f<0.20.$$

10. The image pickup optical lens assembly of claim 7, wherein f is the focal length of the image pickup optical lens assembly, $f_4$ is the focal length of the fourth lens element, $f_5$ is a focal length of the fifth lens element, and the following relation is satisfied:

$$|f/f_4|+|f/f_5|<3.5.$$

11. The image pickup optical lens assembly of claim 2, wherein $f_1$ is a focal length of the first lens element, $f_3$ is a focal length of the third lens element, and the following relation is satisfied:

$$|f_1/f_3|<0.50.$$

12. The image pickup optical lens assembly of claim 2, wherein $f_1$ is a focal length of the first lens element, $f_3$ is a focal length of the third lens element, and the following relation is satisfied:

$$|f_1/f_3|<0.35.$$

13. The image pickup optical lens assembly of claim 2, wherein f is a focal length of the image pickup optical lens assembly, $R_5$ is the curvature radius of the object-side surface of the third lens element, $R_6$ is the curvature radius of the image-side surface of the third lens element, and the following relation is satisfied:

$$(|R_5|+|R_6|)/f<2.0.$$

14. The image pickup optical lens assembly of claim 1, further comprising an image sensor at an image plane, wherein TTL is a distance from the object-side surface of the first lens element to the image plane along the optical axis, ImgH is half of the diagonal length of an effective photosensitive area of the image sensor, and the following relation is satisfied:

$$TTL/ImgH<2.00.$$

15. An image pickup optical lens assembly, sequentially arranged from an object side to an image side, comprising:
a first lens element with positive refractive power, having a convex object-side surface;
a second lens element with negative refractive power, having a concave object-side surface and a convex image-side surface;
a third lens element with negative refractive power;
a fourth lens element with refractive power, made of a plastic material, having a concave object-side surface and a convex image-side surface, and both of its object-side surface and image-side surface being aspheric;
a fifth lens element with refractive power, made of a plastic material, and having a concave image-side surface, both of its object-side surface and image-side surface being aspheric, and the image-side surface of the fifth lens element having at least one inflection point;
wherein, $R_3$ is a curvature radius of the object-side surface of the second lens element, $R_4$ is a curvature radius of the image-side surface of the second lens element, $f_1$ is a focal length of the first lens element, $f_3$ is a focal length of the third lens element, and the following relations are satisfied:

$$-6.0<(R_3+R_4)/(R_3-R_4)<-1.0;$$

$$|f_1/f_3|<0.75.$$

16. The image pickup optical lens assembly of claim 15, wherein $f_1$ is the focal length of the first lens element, $f_3$ is the focal length of the third lens element, and the following relation is satisfied:

$$|f_1/f_3|<0.50.$$

17. The image pickup optical lens assembly of claim 16, wherein $v_1$ is an Abbe number of the first lens element, $v_2$ is an Abbe number of the second lens element, and the following relation is satisfied:

$$28<v_1-v_2<45.$$

18. The image pickup optical lens assembly of claim 17, wherein the fourth lens element has positive refractive power, and the fifth lens element has negative refractive power.

19. The image pickup optical lens assembly of claim 18, wherein f is a focal length of the image pickup optical lens assembly, $R_5$ is a curvature radius of the object-side surface of the third lens element, $R_6$ is a curvature radius of the image-side surface of the third lens element, and the following relation is satisfied:

$$(|R_5|+|R_6|)/f<4.0.$$

20. The image pickup optical lens assembly of claim 18, wherein $f_1$ is the focal length of the first lens element, $f_3$ is the focal length of the third lens element, and the following relation is preferably satisfied:

$$|f_1/f_3|<0.35.$$

21. The image pickup optical lens assembly of claim 18, wherein f is a focal length of the image pickup optical lens assembly, $CT_4$ is a thickness of the fourth lens element near the optical axis, and the following relation is satisfied:

$$0.04<CT_4/f<0.20.$$

22. The image pickup optical lens assembly of claim 17, wherein the third lens element has a concave image-side surface.

23. An image pickup optical lens assembly, sequentially arranged from an object side to an image side, comprising:
a first lens element with positive refractive power, having a convex object-side surface;
a second lens element with negative refractive power, having a concave object-side surface and a convex image-side surface;
a third lens element with refractive power, having a concave image-side surface;
a fourth lens element with positive refractive power, made of a plastic material, and having a convex image-side surface, and both of its object-side surface and image-side surface being aspheric;
a fifth lens element with negative refractive power, made of a plastic material, and having a concave image-side surface, and both of its object-side surface and image-side surface being aspheric, and the image-side surface of the fifth lens element having at least one inflection point;
wherein, $R_3$ is a curvature radius of the object-side surface of the second lens element, $R_4$ is a curvature radius of the image-side surface of the second lens element, $T_{34}$ is an axial distance between the third lens element and the fourth lens element, $T_{45}$ is an axial distance between the fourth lens element and the fifth lens element, $f_1$ is a focal length of the first lens element, $f_3$ is a focal length of the third lens element, and the following relations are satisfied:

$$-6.0<(R_3+R_4)/(R_3-R_4)<-1.0;$$

$$0.3<T_{34}/T_{45}<2.5;$$

$$|f_1/f_3|<0.75.$$

24. The image pickup optical lens assembly of claim 23, wherein $v_1$ is an Abbe number of the first lens element, $v_2$ is an Abbe number of the second lens element, and the following relation is satisfied:

$$28<v_1-v_2<45.$$

25. The image pickup optical lens assembly of claim 23, wherein $f_1$ is the focal length of the first lens element, $f_3$ is the focal length of the third lens element, and the following relation is preferably satisfied:

$$|f_1/f_3|<0.50.$$

26. The image pickup optical lens assembly of claim 23, wherein f is a focal length of the image pickup optical lens assembly, $R_5$ is a curvature radius of the object-side surface of the third lens element, $R_6$ is a curvature radius of the image-side surface of the third lens element, and the following relation is satisfied:

$$(|R_5|+|R_6|)/f<2.0.$$

27. The image pickup optical lens assembly of claim 23, wherein f is the focal length of the image pickup optical lens assembly, $CT_4$ is a thickness of the fourth lens element near the optical axis, and the following relation is satisfied:

$$0.04<CT_4/f<0.20.$$

* * * * *

UNITED STATES PATENT AND TRADEMARK OFFICE
CERTIFICATE OF CORRECTION

| | | |
|---|---|---|
| PATENT NO. | : 8,179,614 B1 | |
| APPLICATION NO. | : 13/182964 | |
| DATED | : May 15, 2012 | |
| INVENTOR(S) | : Tsung-Han Tsai | |

It is certified that error appears in the above-identified patent and that said Letters Patent is hereby corrected as shown below:

In column 28, line 12, third equation in claim 1, should read $$-0.25 < N_1-N_2 \leqq 0 \qquad (3)$$

Signed and Sealed this
Seventeenth Day of July, 2012

David J. Kappos
*Director of the United States Patent and Trademark Office*